(12) United States Patent
Ur et al.

(10) Patent No.: US 12,321,428 B2
(45) Date of Patent: Jun. 3, 2025

(54) USER AUTHENTICATION DEVICE, USER AUTHENTICATION METHOD, AND USER AUTHENTICATION COMPUTER PROGRAM

(71) Applicant: NIPPON TELEGRAPH AND TELEPHONE CORPORATION, Tokyo (JP)

(72) Inventors: Shmuel Ur, Shorashim (IL); David Ash, Kirkland, WA (US); Vlad Dabija, Mountain View, CA (US)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 654 days.

(21) Appl. No.: 17/370,946

(22) Filed: Jul. 8, 2021

(65) Prior Publication Data
US 2023/0008868 A1 Jan. 12, 2023

(51) Int. Cl.
*G06F 21/31* (2013.01)
*G06F 40/20* (2020.01)
*G06F 40/30* (2020.01)
*G06F 40/40* (2020.01)

(52) U.S. Cl.
CPC ............ *G06F 21/316* (2013.01); *G06F 40/20* (2020.01); *G06F 40/30* (2020.01); *G06F 40/40* (2020.01); *G06F 2221/2103* (2013.01)

(58) Field of Classification Search
None
See application file for complete search history.

(56) References Cited

U.S. PATENT DOCUMENTS

| 5,251,131 | A  | * | 10/1993 | Masand   | G10L 15/18  |
|           |    |   |         |          | 704/9       |
| 6,421,453 | B1 | * | 7/2002  | Kanevsky | G06F 21/316 |
|           |    |   |         |          | 340/5.2     |
| 7,555,431 | B2 | * | 6/2009  | Bennett  | G09B 5/04   |
|           |    |   |         |          | 704/255     |
| 7,725,321 | B2 | * | 5/2010  | Bennett  | G06F 40/216 |
|           |    |   |         |          | 704/270.1   |
| 7,912,701 | B1 | * | 3/2011  | Gray     | G06F 40/30  |
|           |    |   |         |          | 704/7       |

(Continued)

FOREIGN PATENT DOCUMENTS

WO    WO-2017173263 A1 * 10/2017 ........... G06Q 20/202

OTHER PUBLICATIONS

Sulayman et al "Designing Security User Profiles via Anomaly Detection for User Authentication," Crown, pp. 1-6 (Year: 2020).*

(Continued)

*Primary Examiner* — Luu T Pham
*Assistant Examiner* — James J Wilcox

(57) ABSTRACT

A user authentication device includes: a collection part collecting information of a user; a generation part generating a question for the user on the basis of the information of the user collected by the collection part and a skill model of the user; a presentation part presenting the question for the user generated by the generation part to the user; a reception part receiving, from the user, a response to the question presented by the presentation part; and a determination part determining authentication of the user on the basis of the response received by the reception part.

7 Claims, 5 Drawing Sheets

(56) References Cited

U.S. PATENT DOCUMENTS

| | | | | |
|---|---|---|---|---|
| 8,180,713 | B1* | 5/2012 | Rigby | G06Q 40/08 706/12 |
| 8,392,188 | B1* | 3/2013 | Riccardi | G10L 15/187 704/243 |
| 8,869,019 | B1* | 10/2014 | Sampath-Kumar | G06F 40/134 715/208 |
| 8,997,191 | B1* | 3/2015 | Stark | G06F 21/32 726/19 |
| 9,015,476 | B1* | 4/2015 | Juels | G06F 21/34 713/172 |
| 9,116,890 | B2* | 8/2015 | King | G06F 16/41 |
| 9,185,095 | B1* | 11/2015 | Moritz | H04L 63/0861 |
| 9,237,146 | B1* | 1/2016 | Casillas | G06F 21/335 |
| 9,311,461 | B2* | 4/2016 | Basson | G06F 21/31 |
| 9,336,268 | B1* | 5/2016 | Moudy | G06F 40/30 |
| 9,430,624 | B1* | 8/2016 | Mortensen | G06F 21/31 |
| 9,438,604 | B1* | 9/2016 | Addala | H04L 63/0853 |
| 9,471,771 | B1* | 10/2016 | Liu | G06F 21/45 |
| 9,535,901 | B2* | 1/2017 | Allen | G06F 40/30 |
| 9,578,499 | B2* | 2/2017 | Brill | H04W 12/30 |
| 9,715,496 | B1* | 7/2017 | Sapoznik | H04L 51/02 |
| 9,760,627 | B1* | 9/2017 | Bradley | G06F 40/205 |
| 9,838,384 | B1* | 12/2017 | Kane-Parry | G06F 21/316 |
| 9,911,413 | B1* | 3/2018 | Kumar | G06F 40/30 |
| 9,965,462 | B2* | 5/2018 | Werth | G06F 40/30 |
| 9,985,943 | B1* | 5/2018 | Reading | H04L 63/08 |
| 10,078,688 | B2* | 9/2018 | Kolotienko | G06F 40/30 |
| 10,162,956 | B1* | 12/2018 | Truong | G06Q 10/10 |
| 10,170,107 | B1* | 1/2019 | Dreyer | G06F 40/30 |
| 10,231,122 | B2* | 3/2019 | Childress | H04L 63/0853 |
| 10,235,507 | B1* | 3/2019 | Rome | G06F 21/46 |
| 10,282,531 | B1* | 5/2019 | Davey | G06F 21/42 |
| 10,331,791 | B2* | 6/2019 | Anbazhagan | G06F 40/35 |
| 10,431,210 | B1* | 10/2019 | Huang | G06N 3/084 |
| 10,440,184 | B1* | 10/2019 | Mackie | G06F 40/20 |
| 10,460,728 | B2* | 10/2019 | Anbazhagan | G06F 9/4451 |
| 10,470,043 | B1* | 11/2019 | Cherala | H04W 12/12 |
| 10,496,809 | B1* | 12/2019 | Pham | G06N 20/00 |
| 10,503,888 | B2* | 12/2019 | Spencer, III | H04W 12/06 |
| 10,587,553 | B1* | 3/2020 | Ghafourifar | H04L 65/403 |
| 10,607,598 | B1* | 3/2020 | Larson | G10L 15/07 |
| 10,614,207 | B1* | 4/2020 | Truong | G06N 3/088 |
| 10,616,343 | B1* | 4/2020 | Alameh | H04L 67/12 |
| 10,645,219 | B1* | 5/2020 | Mackie | H04M 3/22 |
| 10,732,789 | B1* | 8/2020 | Marcinelli | G06F 40/205 |
| 10,748,538 | B2* | 8/2020 | Lewis | G10L 15/30 |
| 10,754,936 | B1* | 8/2020 | Hawes | G06F 21/45 |
| 10,762,190 | B1* | 9/2020 | Cuan | H04L 63/00 |
| 10,798,030 | B1* | 10/2020 | Igure | G06N 3/084 |
| 10,803,458 | B1* | 10/2020 | Vokes | G06Q 20/3224 |
| 10,817,782 | B1* | 10/2020 | Rando | G06F 40/295 |
| 10,827,071 | B1* | 11/2020 | Adibi | H04L 67/53 |
| 10,854,206 | B1* | 12/2020 | Liu | G06Q 10/00 |
| 10,867,025 | B2* | 12/2020 | Whaley | G06V 40/25 |
| 10,867,129 | B1* | 12/2020 | Fregly | G06F 40/40 |
| 10,915,227 | B1* | 2/2021 | Proud | G06F 9/451 |
| 10,922,493 | B1* | 2/2021 | Das | G06F 40/30 |
| 10,936,962 | B1* | 3/2021 | Neumann | G06N 5/046 |
| 10,943,072 | B1* | 3/2021 | Jaganmohan | G06N 3/045 |
| 10,970,780 | B2* | 4/2021 | Kraemer | H04L 63/06 |
| 10,997,315 | B2* | 5/2021 | Barday | G06Q 30/0203 |
| 11,004,075 | B2* | 5/2021 | Lee | G06Q 20/325 |
| 11,025,439 | B2* | 6/2021 | Theodore | H04W 12/06 |
| 11,055,394 | B2* | 7/2021 | Norris, III | G06F 21/36 |
| 11,061,800 | B2* | 7/2021 | Prakash | G06F 11/3692 |
| 11,069,351 | B1* | 7/2021 | Menon | G10L 15/1815 |
| 11,074,509 | B1* | 7/2021 | Wray | G06N 20/00 |
| 11,080,375 | B2* | 8/2021 | Fuentes | H04L 67/306 |
| 11,086,869 | B1* | 8/2021 | Aleti | G06F 16/2453 |
| 11,087,739 | B1* | 8/2021 | Rastrow | G10L 15/30 |
| 11,106,569 | B1* | 8/2021 | Chapagain | G06F 11/3692 |
| 11,110,288 | B2* | 9/2021 | Kaib | G16H 20/30 |
| 11,113,372 | B2* | 9/2021 | Lewis | G06F 40/30 |
| 11,115,353 | B1* | 9/2021 | Crowley | G06F 40/284 |
| 11,140,193 | B2* | 10/2021 | Patel | G06F 21/577 |
| 11,157,498 | B1* | 10/2021 | James | G06F 9/542 |
| 11,178,521 | B1* | 11/2021 | Roth | H04W 12/06 |
| 11,182,697 | B1* | 11/2021 | Murakonda | G06N 20/00 |
| 11,195,522 | B1* | 12/2021 | Makashir | G10L 15/1815 |
| 11,196,774 | B2* | 12/2021 | Wei | H04L 63/1433 |
| 11,200,892 | B1* | 12/2021 | Stoops | G06F 3/167 |
| 11,210,636 | B1* | 12/2021 | Hughes | G06F 40/30 |
| 11,216,801 | B2* | 1/2022 | Bohra | G06Q 20/3272 |
| 11,218,817 | B1* | 1/2022 | Ganot | H04R 25/505 |
| 11,227,122 | B1* | 1/2022 | Gill | G06N 5/04 |
| 11,232,220 | B2* | 1/2022 | Thibadeau, Sr. | G06F 21/604 |
| 11,233,788 | B1* | 1/2022 | Hitchcock | G06F 21/32 |
| 11,238,049 | B1* | 2/2022 | James | G06F 40/30 |
| 11,250,855 | B1* | 2/2022 | Vozila | G16H 10/60 |
| 11,288,319 | B1* | 3/2022 | Das | G06F 40/186 |
| 11,288,351 | B2* | 3/2022 | Lewis | G06F 21/34 |
| 11,288,513 | B1* | 3/2022 | Desai | G06F 3/167 |
| 11,289,075 | B1* | 3/2022 | Pandey | G10L 15/1815 |
| 11,289,200 | B1* | 3/2022 | Gregg | H04L 63/105 |
| 11,295,738 | B2* | 4/2022 | Bhaya | G06F 40/30 |
| 11,316,865 | B2* | 4/2022 | Gallopyn | H04L 51/02 |
| 11,321,527 | B1* | 5/2022 | Gopalarao | G06F 18/211 |
| 11,327,992 | B1* | 5/2022 | Batsakis | H04L 63/083 |
| 11,347,392 | B1* | 5/2022 | Germann | G06F 3/016 |
| 11,354,599 | B1* | 6/2022 | Hübl | G06N 5/02 |
| 11,361,571 | B1* | 6/2022 | Fusco | G06F 40/30 |
| 11,366,842 | B1* | 6/2022 | Swaminathan | G06F 17/18 |
| 11,373,146 | B1* | 6/2022 | Yerastov | G06Q 10/1053 |
| 11,379,843 | B2* | 7/2022 | Saka | G06Q 20/4016 |
| 11,386,158 | B1* | 7/2022 | Bourbie | G06F 16/90324 |
| 11,392,578 | B1* | 7/2022 | James | G06F 16/24573 |
| 11,399,048 | B1* | 7/2022 | Huang | H04L 65/4053 |
| 11,404,075 | B1* | 8/2022 | Lakhani | G10L 25/51 |
| 11,449,946 | B1* | 9/2022 | Gutsell | G06F 40/205 |
| 11,468,239 | B2* | 10/2022 | Olabiyi | G06N 3/08 |
| 11,475,053 | B1* | 10/2022 | Das | G06F 16/3344 |
| 11,475,245 | B1* | 10/2022 | Foltz | G06F 16/904 |
| 11,494,514 | B1* | 11/2022 | Amico | G06F 21/73 |
| 11,507,752 | B1* | 11/2022 | Bhowmik | G06F 40/289 |
| 11,508,372 | B1* | 11/2022 | Schwartz | G10L 15/22 |
| 11,531,735 | B1* | 12/2022 | Patel | G06F 21/316 |
| 11,531,736 | B1* | 12/2022 | Sun | G10L 17/00 |
| 11,544,470 | B2* | 1/2023 | Zhang | G10L 15/16 |
| 11,551,663 | B1* | 1/2023 | Bissell | G06F 3/167 |
| 11,568,087 | B2* | 1/2023 | Kinai | G06F 9/547 |
| 11,568,246 | B1* | 1/2023 | Yeh | G06N 3/063 |
| 11,573,955 | B1* | 2/2023 | James | G06F 16/2228 |
| 11,587,559 | B2* | 2/2023 | Newendorp | H04N 21/41407 |
| 11,593,466 | B1* | 2/2023 | Kuttappa | G10L 25/63 |
| 11,600,263 | B1* | 3/2023 | Blair | G06T 1/00 |
| 11,614,952 | B2* | 3/2023 | Goldberg | G06F 9/451 713/168 |
| 11,644,955 | B1* | 5/2023 | Singamneni | G06F 3/0481 707/722 |
| 11,654,357 | B1* | 5/2023 | Johnston | A63F 13/798 463/31 |
| 11,676,220 | B2* | 6/2023 | Natarajan | G10L 17/06 707/771 |
| 11,681,364 | B1* | 6/2023 | Zhang | G06N 3/0455 345/156 |
| 11,699,155 | B2* | 7/2023 | Dutt | G06Q 20/322 705/325 |
| 11,736,423 | B2* | 8/2023 | Wang | G06V 10/454 709/206 |
| 11,755,848 | B1* | 9/2023 | Dan | G06N 20/00 704/270.1 |
| 11,756,538 | B1* | 9/2023 | Dell | G10L 15/02 704/232 |
| 11,783,824 | B1* | 10/2023 | Mars | G06F 40/40 704/270 |
| 11,853,975 | B1* | 12/2023 | Leblang | G06F 16/245 |
| 11,868,381 | B2* | 1/2024 | Müller | G06F 40/284 |
| 11,868,728 | B1* | 1/2024 | Meissner | G06F 3/0484 |
| 11,907,676 | B1* | 2/2024 | Pemberton | G06F 40/30 |
| 11,908,027 | B1* | 2/2024 | Theoharis | G06Q 10/083 |
| 11,924,637 | B1* | 3/2024 | Holman | H04W 12/64 |

(56) References Cited

U.S. PATENT DOCUMENTS

| | | | | |
|---|---|---|---|---|
| 11,972,463 B1* | 4/2024 | Nguyen | | G06F 40/30 |
| 12,014,192 B2* | 6/2024 | Riva | | G06F 3/0484 |
| 12,020,250 B2* | 6/2024 | Miller | | H04L 63/102 |
| 12,026,630 B2* | 7/2024 | Thornley | | G06N 5/04 |
| 12,028,433 B2* | 7/2024 | Walsh | | G06F 9/546 |
| 12,141,791 B2* | 11/2024 | Khalfan | | H04L 9/321 |
| 12,182,950 B2* | 12/2024 | Greunke | | G06F 16/24573 |
| 12,206,789 B2* | 1/2025 | Ladd | | H04L 9/3265 |
| 2001/0049707 A1* | 12/2001 | Tran | | G06F 40/131 |
| | | | | 715/256 |
| 2002/0002450 A1* | 1/2002 | Nunberg | | G06F 40/30 |
| | | | | 707/E17.09 |
| 2002/0174073 A1* | 11/2002 | Nordman | | G06Q 20/382 |
| | | | | 705/64 |
| 2002/0174106 A1* | 11/2002 | Martin | | G06F 40/284 |
| 2002/0198909 A1* | 12/2002 | Huynh | | G06F 40/30 |
| | | | | 715/201 |
| 2004/0143749 A1* | 7/2004 | Tajalli | | G06F 21/316 |
| | | | | 726/23 |
| 2006/0143157 A1* | 6/2006 | Landsman | | G06Q 10/10 |
| 2006/0156385 A1* | 7/2006 | Chiviendacz | | H04L 9/3271 |
| | | | | 726/2 |
| 2006/0294390 A1* | 12/2006 | Navratil | | G06F 21/31 |
| | | | | 713/182 |
| 2007/0005967 A1* | 1/2007 | Mister | | G06Q 10/107 |
| | | | | 713/168 |
| 2007/0055656 A1* | 3/2007 | Tunstall-Pedoe | | G06N 5/00 |
| 2008/0060051 A1* | 3/2008 | Lim | | G06F 16/93 |
| | | | | 726/1 |
| 2008/0189307 A1* | 8/2008 | Sankaran | | G06F 40/30 |
| 2009/0037983 A1* | 2/2009 | Chiruvolu | | G06F 21/31 |
| | | | | 726/4 |
| 2009/0077124 A1* | 3/2009 | Spivack | | G06F 16/25 |
| 2009/0089869 A1* | 4/2009 | Varghese | | G07F 7/1008 |
| | | | | 726/7 |
| 2009/0198587 A1* | 8/2009 | Wagner | | G06Q 30/0281 |
| | | | | 705/26.1 |
| 2009/0265163 A1* | 10/2009 | Li | | G06Q 10/10 |
| | | | | 704/10 |
| 2010/0023319 A1* | 1/2010 | Bikel | | G06F 40/169 |
| | | | | 704/9 |
| 2010/0037056 A1* | 2/2010 | Follis | | G06F 21/604 |
| | | | | 713/168 |
| 2011/0035208 A1* | 2/2011 | Hale | | G06F 40/242 |
| | | | | 704/E11.001 |
| 2011/0191838 A1* | 8/2011 | Yanagihara | | G06F 21/00 |
| | | | | 726/26 |
| 2011/0231913 A1* | 9/2011 | Feng | | G06F 21/46 |
| | | | | 726/7 |
| 2011/0270604 A1* | 11/2011 | Qi | | G06F 40/30 |
| | | | | 704/9 |
| 2011/0307435 A1* | 12/2011 | Overell | | G06F 16/367 |
| | | | | 706/46 |
| 2011/0320816 A1* | 12/2011 | Yao | | G06F 21/32 |
| | | | | 713/176 |
| 2012/0016678 A1* | 1/2012 | Gruber | | G06F 16/9537 |
| | | | | 704/E21.001 |
| 2012/0151559 A1* | 6/2012 | Koudys | | G06F 21/316 |
| | | | | 726/23 |
| 2012/0214442 A1* | 8/2012 | Crawford | | G06F 21/316 |
| | | | | 455/411 |
| 2012/0254333 A1* | 10/2012 | Chandramouli | | G06F 40/10 |
| | | | | 709/206 |
| 2013/0007864 A1* | 1/2013 | Puflea | | G06F 21/33 |
| | | | | 726/7 |
| 2013/0019286 A1* | 1/2013 | Barborak | | G06F 40/20 |
| | | | | 726/17 |
| 2013/0036458 A1* | 2/2013 | Liberman | | G06F 21/32 |
| | | | | 726/5 |
| 2013/0044055 A1* | 2/2013 | Karmarkar | | G06F 21/32 |
| | | | | 345/158 |
| 2013/0073280 A1* | 3/2013 | O'Neil | | G06F 40/20 |
| | | | | 704/E11.001 |
| 2013/0110498 A1* | 5/2013 | Bekkerman | | G06F 40/205 |
| | | | | 704/9 |
| 2013/0124189 A1* | 5/2013 | Baldwin | | G06F 40/20 |
| | | | | 704/235 |
| 2013/0132091 A1* | 5/2013 | Skerpac | | G07C 9/37 |
| | | | | 704/273 |
| 2013/0133048 A1* | 5/2013 | Wyn-Harris | | H04L 63/102 |
| | | | | 726/5 |
| 2013/0138428 A1* | 5/2013 | Chandramouli | | H04L 63/1416 |
| | | | | 704/9 |
| 2013/0185071 A1 | 7/2013 | Chen et al. | | |
| 2013/0227700 A1* | 8/2013 | Dhillon | | H04L 63/105 |
| | | | | 726/26 |
| 2013/0339141 A1* | 12/2013 | Stibel | | G06Q 30/0207 |
| | | | | 726/4 |
| 2014/0019385 A1* | 1/2014 | Dawson | | G06F 40/205 |
| | | | | 706/55 |
| 2014/0123256 A1* | 5/2014 | Curren | | G06F 21/31 |
| | | | | 726/5 |
| 2014/0127219 A1* | 5/2014 | Sahin | | C07K 16/30 |
| | | | | 424/139.1 |
| 2014/0237577 A1* | 8/2014 | Li | | G06F 21/36 |
| | | | | 726/7 |
| 2014/0258324 A1* | 9/2014 | Mauro | | G06F 16/2423 |
| | | | | 707/766 |
| 2014/0282964 A1* | 9/2014 | Stubblefield | | H04L 63/20 |
| | | | | 726/7 |
| 2014/0317726 A1* | 10/2014 | Turgeman | | H04W 12/06 |
| | | | | 726/19 |
| 2014/0317744 A1* | 10/2014 | Turgeman | | H04W 12/122 |
| | | | | 726/23 |
| 2014/0325223 A1* | 10/2014 | Turgeman | | G06F 21/31 |
| | | | | 713/168 |
| 2014/0325645 A1* | 10/2014 | Turgeman | | G06F 3/04892 |
| | | | | 726/22 |
| 2014/0325646 A1* | 10/2014 | Turgeman | | G06F 21/316 |
| | | | | 726/22 |
| 2014/0325682 A1* | 10/2014 | Turgeman | | G06F 21/316 |
| | | | | 726/29 |
| 2014/0344927 A1* | 11/2014 | Turgeman | | G06F 21/31 |
| | | | | 726/22 |
| 2014/0364099 A1* | 12/2014 | Pai | | H04M 1/724 |
| | | | | 455/418 |
| 2015/0026796 A1* | 1/2015 | Alan | | G06F 21/31 |
| | | | | 726/19 |
| 2015/0033305 A1* | 1/2015 | Shear | | G06F 21/53 |
| | | | | 726/11 |
| 2015/0039297 A1* | 2/2015 | Greer | | G06F 3/0481 |
| | | | | 704/9 |
| 2015/0046145 A1* | 2/2015 | Hamahata | | G06F 40/197 |
| | | | | 704/2 |
| 2015/0066479 A1* | 3/2015 | Pasupalak | | G06F 16/90332 |
| | | | | 704/9 |
| 2015/0073777 A1* | 3/2015 | Assam | | G06F 40/30 |
| | | | | 704/9 |
| 2015/0089623 A1* | 3/2015 | Sondhi | | H04L 63/205 |
| | | | | 726/9 |
| 2015/0096002 A1 | 4/2015 | Shuart et al. | | |
| 2015/0106704 A1* | 4/2015 | Towle | | G09B 7/04 |
| | | | | 715/271 |
| 2015/0135309 A1* | 5/2015 | Karmarkar | | G06F 16/532 |
| | | | | 726/19 |
| 2015/0156208 A1* | 6/2015 | Kirkham | | G06F 21/31 |
| | | | | 726/4 |
| 2015/0194149 A1* | 7/2015 | Faizakof | | G10L 15/1815 |
| | | | | 704/257 |
| 2015/0205955 A1* | 7/2015 | Turgeman | | H04L 63/10 |
| | | | | 726/7 |
| 2015/0205957 A1* | 7/2015 | Turgeman | | G06F 21/554 |
| | | | | 726/23 |
| 2015/0213251 A1* | 7/2015 | Turgeman | | H04W 12/06 |
| | | | | 726/7 |
| 2015/0242605 A1* | 8/2015 | Du | | G06F 21/32 |
| | | | | 726/7 |

(56) References Cited

U.S. PATENT DOCUMENTS

| | | | |
|---|---|---|---|
| 2015/0269139 A1* | 9/2015 | McAteer | G06F 40/30 704/9 |
| 2015/0286790 A1* | 10/2015 | Ahmad | G16H 40/20 705/2 |
| 2015/0310195 A1* | 10/2015 | Bailor | G06F 21/45 726/6 |
| 2015/0310196 A1* | 10/2015 | Turgeman | H04W 12/06 726/19 |
| 2015/0324563 A1* | 11/2015 | Deutschmann | G06F 16/285 726/7 |
| 2015/0326570 A1* | 11/2015 | Publicover | G06V 40/197 382/117 |
| 2015/0339477 A1* | 11/2015 | Abrams | H04L 63/1416 726/23 |
| 2015/0348565 A1* | 12/2015 | Rhoten | G06F 16/243 704/270.1 |
| 2015/0363384 A1* | 12/2015 | Williams | G06F 40/30 704/9 |
| 2015/0381652 A1* | 12/2015 | Wardman | H04L 63/1441 726/23 |
| 2016/0027198 A1* | 1/2016 | Terry | G06F 40/40 345/473 |
| 2016/0057623 A1* | 2/2016 | Dutt | H04W 12/126 455/411 |
| 2016/0103827 A1* | 4/2016 | Nguyen Manh | G06F 16/93 707/755 |
| 2016/0110528 A1* | 4/2016 | Gupta | H04L 63/08 726/19 |
| 2016/0162456 A1* | 6/2016 | Munro | G06F 16/24532 704/9 |
| 2016/0162458 A1* | 6/2016 | Munro | G06F 16/93 715/230 |
| 2016/0247061 A1* | 8/2016 | Trask | G06N 3/08 |
| 2016/0248803 A1* | 8/2016 | O'Connell | G06F 16/2358 |
| 2016/0253434 A1* | 9/2016 | Yu | G06F 40/30 707/760 |
| 2016/0330573 A1* | 11/2016 | Masoud | H04W 12/0431 |
| 2016/0350283 A1* | 12/2016 | Carus | G06F 40/284 |
| 2016/0371476 A1* | 12/2016 | Turgeman | G06F 3/04842 |
| 2017/0017635 A1* | 1/2017 | Leliwa | G06F 40/258 |
| 2017/0017781 A1* | 1/2017 | Turgeman | H04L 63/08 |
| 2017/0032138 A1* | 2/2017 | Navda | G06F 21/6218 |
| 2017/0034183 A1* | 2/2017 | Enqvist | G06F 21/316 |
| 2017/0070510 A1* | 3/2017 | Ramalingam | H04L 63/08 |
| 2017/0075877 A1* | 3/2017 | Lepeltier | G06F 40/117 |
| 2017/0076518 A1* | 3/2017 | Patterson | G06F 21/00 |
| 2017/0091450 A1* | 3/2017 | Turgeman | H04L 63/145 |
| 2017/0103472 A1* | 4/2017 | Shah | H04L 9/32 |
| 2017/0116204 A1* | 4/2017 | Davulcu | G06F 16/355 |
| 2017/0124462 A1* | 5/2017 | Arbajian | G06N 20/00 |
| 2017/0140141 A1* | 5/2017 | Yan | G06F 21/32 |
| 2017/0140279 A1* | 5/2017 | Turgeman | G06N 20/00 |
| 2017/0147910 A1* | 5/2017 | Mao | G06F 18/2413 |
| 2017/0154366 A1* | 6/2017 | Turgeman | G06F 21/316 |
| 2017/0161372 A1* | 6/2017 | Fernández | G06F 40/211 |
| 2017/0193526 A1* | 7/2017 | Turgeman | G06Q 30/0185 |
| 2017/0200093 A1* | 7/2017 | Motahari Nezhad | G06Q 10/1095 |
| 2017/0220786 A1* | 8/2017 | Guo | G06F 21/36 |
| 2017/0221064 A1* | 8/2017 | Turgeman | H04W 12/06 |
| 2017/0228365 A1* | 8/2017 | Levy | G06F 40/30 |
| 2017/0235824 A1* | 8/2017 | Liu | G06Q 40/00 707/723 |
| 2017/0237628 A1* | 8/2017 | Purdy | H04L 41/0843 709/223 |
| 2017/0242843 A1* | 8/2017 | Jiao | G06F 40/174 |
| 2017/0278417 A1* | 9/2017 | Ur | G09B 7/06 |
| 2017/0278510 A1* | 9/2017 | Zhao | G06F 40/30 |
| 2017/0323203 A1* | 11/2017 | Matusov | G06N 3/044 |
| 2017/0364503 A1* | 12/2017 | Anisimovich | G06F 40/30 |
| 2017/0366480 A1* | 12/2017 | Sagar | H04L 51/04 |
| 2017/0366481 A1* | 12/2017 | Sagar | H04L 51/04 |
| 2017/0366621 A1* | 12/2017 | Sagar | H04L 67/148 |
| 2018/0007553 A1* | 1/2018 | Dutt | H04W 12/06 |
| 2018/0034850 A1* | 2/2018 | Turgeman | G06Q 30/0275 |
| 2018/0052842 A1* | 2/2018 | Hewavitharana | G06F 16/24522 |
| 2018/0052884 A1* | 2/2018 | Kale | G06F 16/242 |
| 2018/0052885 A1* | 2/2018 | Gaskill | G06N 5/04 |
| 2018/0060306 A1* | 3/2018 | Starostin | G06F 40/30 |
| 2018/0061401 A1* | 3/2018 | Sarikaya | G06Q 10/02 |
| 2018/0068031 A1* | 3/2018 | Hewavitharana | G06F 9/30156 |
| 2018/0075554 A1* | 3/2018 | Clark | G06F 40/47 |
| 2018/0089163 A1* | 3/2018 | Ben Ami | H04L 51/02 |
| 2018/0089601 A1* | 3/2018 | Link | G06F 16/90335 |
| 2018/0097940 A1* | 4/2018 | Beilis | H04M 3/5235 |
| 2018/0113856 A1* | 4/2018 | Anisimovich | G06F 40/211 |
| 2018/0114219 A1* | 4/2018 | Setchell | H04L 9/3226 |
| 2018/0114234 A1* | 4/2018 | Fighel | G06Q 30/016 |
| 2018/0123997 A1* | 5/2018 | Celedonia | H04L 67/306 |
| 2018/0129181 A1* | 5/2018 | Kratzer, III | G06F 40/30 |
| 2018/0129648 A1* | 5/2018 | Chakravarthy | G06F 40/58 |
| 2018/0143975 A1* | 5/2018 | Casal | G06F 40/51 |
| 2018/0144309 A1* | 5/2018 | Rolle | H04L 51/216 |
| 2018/0150524 A1* | 5/2018 | Anger | G06F 16/9535 |
| 2018/0157642 A1* | 6/2018 | Matskevich | G06F 40/211 |
| 2018/0160309 A1* | 6/2018 | Turgeman | G06F 3/041 |
| 2018/0181559 A1* | 6/2018 | Matskevich | G06F 40/216 |
| 2018/0181651 A1* | 6/2018 | Pospelova | G06F 40/268 |
| 2018/0191699 A1* | 7/2018 | Assali | H04L 63/08 |
| 2018/0205727 A1* | 7/2018 | Hwang | H04L 63/08 |
| 2018/0218303 A1* | 8/2018 | Cole | G06N 20/00 |
| 2018/0225281 A1* | 8/2018 | Song | G06N 5/02 |
| 2018/0232110 A1* | 8/2018 | Cheung | G06F 3/0482 |
| 2018/0232111 A1* | 8/2018 | Jones | G06F 3/0482 |
| 2018/0232651 A1* | 8/2018 | Potter | G06F 16/9535 |
| 2018/0239959 A1* | 8/2018 | Bui | G06F 16/93 |
| 2018/0242149 A1* | 8/2018 | Verma | H04L 63/08 |
| 2018/0247191 A1* | 8/2018 | Katz | G06F 21/53 |
| 2018/0247272 A1* | 8/2018 | Cunico | H04L 67/306 |
| 2018/0253706 A1* | 9/2018 | Miller | G06Q 20/4014 |
| 2018/0260385 A1* | 9/2018 | Fan | G06F 40/274 |
| 2018/0260746 A1* | 9/2018 | Xiong | G06F 40/40 |
| 2018/0267958 A1* | 9/2018 | Danielyan | G06F 40/289 |
| 2018/0286265 A1* | 10/2018 | Matsumoto | G06Q 50/01 |
| 2018/0288211 A1* | 10/2018 | Kim | H04M 1/72436 |
| 2018/0300465 A1* | 10/2018 | Esman | G06N 3/082 |
| 2018/0314689 A1* | 11/2018 | Wang | G10L 15/1822 |
| 2018/0314816 A1* | 11/2018 | Turgeman | G06F 21/40 |
| 2018/0324186 A1* | 11/2018 | Dintenfass | G06F 21/31 |
| 2018/0324215 A1* | 11/2018 | Kalia | H04L 63/20 |
| 2018/0338032 A1* | 11/2018 | Baek | H04W 88/02 |
| 2018/0341396 A1* | 11/2018 | Yaseen | G06F 16/90332 |
| 2018/0349583 A1* | 12/2018 | Turgeman | H04L 63/0861 |
| 2018/0365784 A1* | 12/2018 | Sartori | G06Q 50/26 |
| 2018/0366021 A1* | 12/2018 | Zertuche | G09B 7/00 |
| 2018/0373994 A1* | 12/2018 | Doucette | G06N 7/08 |
| 2018/0374375 A1* | 12/2018 | Doucette | G06Q 10/06398 |
| 2019/0012441 A1* | 1/2019 | Tuli | G06N 3/02 |
| 2019/0025800 A1* | 1/2019 | Goyal | G05B 19/4155 |
| 2019/0026106 A1* | 1/2019 | Burton | G06F 8/71 |
| 2019/0043054 A1* | 2/2019 | Crank | H04W 12/08 |
| 2019/0065453 A1* | 2/2019 | Bulgakov | G06F 40/211 |
| 2019/0065625 A1* | 2/2019 | Shinn | G06F 40/40 |
| 2019/0074006 A1* | 3/2019 | Kumar | G06F 3/167 |
| 2019/0089701 A1* | 3/2019 | Mercury | G06F 30/20 |
| 2019/0095599 A1* | 3/2019 | Iliofotou | G06F 16/337 |
| 2019/0116136 A1* | 4/2019 | Baudart | H04L 63/1491 |
| 2019/0138639 A1* | 5/2019 | Pal | G06F 16/211 |
| 2019/0138640 A1* | 5/2019 | Pal | G06F 16/2471 |
| 2019/0138641 A1* | 5/2019 | Pal | G06F 16/27 |
| 2019/0140996 A1* | 5/2019 | Silberstein | G06Q 10/109 |
| 2019/0147084 A1* | 5/2019 | Pal | G06F 40/205 707/769 |
| 2019/0156292 A1* | 5/2019 | Wehrle | G06F 40/205 |
| 2019/0156921 A1* | 5/2019 | Kohli | G06F 16/93 |
| 2019/0171660 A1* | 6/2019 | Kershaw | G06F 40/30 |
| 2019/0179896 A1* | 6/2019 | Anisimovich | G06N 3/088 |
| 2019/0179897 A1* | 6/2019 | Matskevich | G06F 40/211 |
| 2019/0180175 A1* | 6/2019 | Meteer | G10L 15/26 |
| 2019/0236140 A1* | 8/2019 | Canim | G06F 40/30 |
| 2019/0236210 A1* | 8/2019 | Makaremi | G06F 16/2471 |

(56) References Cited

U.S. PATENT DOCUMENTS

| | | |
|---|---|---|
| 2019/0236469 A1* | 8/2019 | Canim .................. G06N 5/022 |
| 2019/0258701 A1* | 8/2019 | Leshem ................ G06F 40/30 |
| 2019/0258900 A1* | 8/2019 | Baikadi ................ G06N 20/00 |
| 2019/0259293 A1* | 8/2019 | Hellman ............... G06F 16/40 |
| 2019/0260804 A1* | 8/2019 | Beck .................. G06F 16/2455 |
| 2019/0272361 A1* | 9/2019 | Kursun ................ H04L 67/535 |
| 2019/0279767 A1* | 9/2019 | Bates .................. G16H 40/63 |
| 2019/0297498 A1* | 9/2019 | Verma .................. G06F 21/32 |
| 2019/0306107 A1* | 10/2019 | Galbraith ............. H04L 51/56 |
| 2019/0311036 A1* | 10/2019 | Shanmugam ........... G06F 40/56 |
| 2019/0320038 A1* | 10/2019 | Walsh ................ G06F 16/9574 |
| 2019/0332669 A1* | 10/2019 | Lewis ................ G06F 16/3344 |
| 2019/0340217 A1* | 11/2019 | Tran .................... G06F 40/174 |
| 2019/0355346 A1* | 11/2019 | Bellegarda ........... G06F 40/216 |
| 2019/0361966 A1* | 11/2019 | Munro .............. G06F 16/24532 |
| 2019/0377825 A1* | 12/2019 | Chang ................. G06F 16/328 |
| 2019/0377853 A1* | 12/2019 | Obaidi ................. G06F 21/32 |
| 2019/0384895 A1* | 12/2019 | Jin ..................... G06F 21/6245 |
| 2019/0385595 A1* | 12/2019 | Wabgaonkar ........ G10L 15/16 |
| 2019/0392035 A1* | 12/2019 | Indenbom ........... G06F 40/284 |
| 2020/0012584 A1* | 1/2020 | Walters ............. G06F 16/2237 |
| 2020/0012800 A1* | 1/2020 | Karako ................ H04L 63/0853 |
| 2020/0012935 A1* | 1/2020 | Goodsitt ............... G06T 7/194 |
| 2020/0042596 A1* | 2/2020 | Ravi .................. G06F 40/253 |
| 2020/0050620 A1* | 2/2020 | Clark .................. G06N 20/00 |
| 2020/0051178 A1* | 2/2020 | Albouyeh ............ G06N 7/01 |
| 2020/0058299 A1* | 2/2020 | Lee .................. G10L 15/1815 |
| 2020/0065384 A1* | 2/2020 | Costello .............. G06N 3/04 |
| 2020/0074052 A1* | 3/2020 | Cunico ................ G06F 40/205 |
| 2020/0089847 A1* | 3/2020 | Poole .................. G06F 21/316 |
| 2020/0103244 A1* | 4/2020 | Cella .................. G05D 1/228 |
| 2020/0104731 A1* | 4/2020 | Oliner .................. G06N 5/04 |
| 2020/0104966 A1* | 4/2020 | Cella .................. B60W 40/08 |
| 2020/0117791 A1* | 4/2020 | Bingham ............ H04L 9/0637 |
| 2020/0118559 A1* | 4/2020 | Huang ................ G10L 15/1815 |
| 2020/0119922 A1* | 4/2020 | Bingham ............ H04L 9/0637 |
| 2020/0125944 A1* | 4/2020 | Jauhar ................ G06N 3/044 |
| 2020/0160458 A1* | 5/2020 | Bodin .................. H04L 67/53 |
| 2020/0169543 A1* | 5/2020 | Vaughn ............... H04L 51/04 |
| 2020/0183928 A1* | 6/2020 | Wu .................... G06N 5/022 |
| 2020/0184016 A1* | 6/2020 | Roller .................. G06N 3/08 |
| 2020/0184052 A1* | 6/2020 | Ellison ................ G06F 21/36 |
| 2020/0184151 A1* | 6/2020 | Ekmekci ............. G06F 9/542 |
| 2020/0201967 A1* | 6/2020 | Maxwell ............ H04L 63/0861 |
| 2020/0202029 A1* | 6/2020 | Tadayon ............. H04W 12/02 |
| 2020/0226479 A1* | 7/2020 | Germanakos ........ G06F 40/30 |
| 2020/0234003 A1* | 7/2020 | Bakman .............. H04M 1/72403 |
| 2020/0234605 A1* | 7/2020 | Shuart ................ G06F 21/316 |
| 2020/0234700 A1* | 7/2020 | Heltewig ............ G06F 40/56 |
| 2020/0243174 A1* | 7/2020 | Burgess .............. G06V 30/40 |
| 2020/0250230 A1* | 8/2020 | Abhyankar ......... G06F 16/9535 |
| 2020/0250235 A1* | 8/2020 | Abhyankar ......... G06F 16/9038 |
| 2020/0250275 A1* | 8/2020 | Chowdhury ......... G06F 40/30 |
| 2020/0257503 A1* | 8/2020 | Weng .................. G06N 3/08 |
| 2020/0272606 A1* | 8/2020 | Leonov ............... G06F 40/30 |
| 2020/0279020 A1* | 9/2020 | Bar-on ................ G06Q 10/0633 |
| 2020/0285700 A1* | 9/2020 | Narayanan ........... G06N 5/01 |
| 2020/0293950 A1* | 9/2020 | Sanchez .............. G06N 20/00 |
| 2020/0302913 A1* | 9/2020 | Marcinkiewicz .... G10L 15/02 |
| 2020/0311210 A1* | 10/2020 | Nama .................. G06F 40/289 |
| 2020/0311615 A1* | 10/2020 | Jammalamadaka ... G06N 20/20 |
| 2020/0311683 A1* | 10/2020 | Chua .................... G06F 18/22 |
| 2020/0320414 A1* | 10/2020 | Neumann ............. G06N 5/04 |
| 2020/0322361 A1* | 10/2020 | Ravindra ............. G06F 40/279 |
| 2020/0334334 A1* | 10/2020 | Keskar ................ G06N 3/084 |
| 2020/0342175 A1* | 10/2020 | Gadde ................. G06F 16/3329 |
| 2020/0342850 A1* | 10/2020 | Vishnoi ............... G06F 40/30 |
| 2020/0342874 A1* | 10/2020 | Teserra ................ G06F 40/30 |
| 2020/0349199 A1* | 11/2020 | Jayaraman ........... G06F 40/49 |
| 2020/0349464 A1* | 11/2020 | Lin ....................... G06N 3/084 |
| 2020/0349919 A1* | 11/2020 | Wanas ................. G10L 15/1815 |
| 2020/0364271 A1* | 11/2020 | Seol .................... G06N 3/084 |
| 2020/0364737 A1* | 11/2020 | Surati ................. H04L 51/02 |
| 2020/0387594 A1* | 12/2020 | Sandstrom ........... G06F 21/316 |
| 2020/0394733 A1* | 12/2020 | Lewis ................ G06N 20/00 |
| 2021/0005190 A1* | 1/2021 | Ji ......................... G06F 3/167 |
| 2021/0026943 A1* | 1/2021 | Tiller .................. G06F 21/62 |
| 2021/0027222 A1* | 1/2021 | Rando ................ G06F 40/279 |
| 2021/0044659 A1* | 2/2021 | Kursun ................ H04L 67/146 |
| 2021/0064726 A1* | 3/2021 | Mannby .............. H04L 63/0861 |
| 2021/0065320 A1* | 3/2021 | Bleiweiss ............ G06F 40/289 |
| 2021/0073526 A1* | 3/2021 | Zeng .................... G06V 20/41 |
| 2021/0081609 A1* | 3/2021 | Johnson ............... G06F 40/242 |
| 2021/0081615 A1* | 3/2021 | McRitchie ........... H04L 51/02 |
| 2021/0081819 A1* | 3/2021 | Polleri ................. G06N 5/022 |
| 2021/0082397 A1* | 3/2021 | Kennewick .......... G06F 3/167 |
| 2021/0082400 A1* | 3/2021 | Vishnoi ............... G06F 40/284 |
| 2021/0082410 A1* | 3/2021 | Teserra ................ H04L 51/02 |
| 2021/0082424 A1* | 3/2021 | Johnson ............... G10L 15/22 |
| 2021/0083994 A1* | 3/2021 | Pan .................... G06F 18/23213 |
| 2021/0089934 A1* | 3/2021 | Thornley .............. G06F 40/216 |
| 2021/0089936 A1* | 3/2021 | Zhao .................. G06N 3/006 |
| 2021/0097140 A1* | 4/2021 | Chatterjee ............ G06N 5/022 |
| 2021/0097571 A1* | 4/2021 | Jin ...................... G06F 9/547 |
| 2021/0099464 A1* | 4/2021 | Seaborn .............. H04L 63/126 |
| 2021/0109769 A1* | 4/2021 | Yang .................. G06F 40/30 |
| 2021/0110014 A1* | 4/2021 | Turgeman ........... G06F 11/3419 |
| 2021/0110330 A1* | 4/2021 | Li ...................... G06Q 10/063112 |
| 2021/0118442 A1* | 4/2021 | Poddar ................. G06N 5/022 |
| 2021/0120206 A1* | 4/2021 | Liu .................... H04L 67/306 |
| 2021/0124843 A1* | 4/2021 | Vass .................... G06Q 30/0255 |
| 2021/0125058 A1* | 4/2021 | Chowdhury .......... G06N 3/088 |
| 2021/0133533 A1* | 5/2021 | Adibi .................. H04M 3/5238 |
| 2021/0133627 A1* | 5/2021 | Neumann ............. G06N 7/01 |
| 2021/0133764 A1* | 5/2021 | Adibi .................. G10L 15/26 |
| 2021/0134179 A1* | 5/2021 | Zilca .................. G06F 40/40 |
| 2021/0136208 A1* | 5/2021 | Adibi .................. G06N 5/022 |
| 2021/0142164 A1* | 5/2021 | Liu ..................... G06F 40/216 |
| 2021/0152507 A1* | 5/2021 | Pengiel ............... H04L 63/0846 |
| 2021/0157715 A1* | 5/2021 | Hand .................. G06Q 10/06313 |
| 2021/0158234 A1* | 5/2021 | Sivasubramanian ... G10L 15/26 |
| 2021/0158235 A1* | 5/2021 | Sivasubramanian ........................ G06F 16/685 |
| 2021/0158805 A1* | 5/2021 | Sivasubramanian .... G06N 5/04 |
| 2021/0158813 A1* | 5/2021 | Sivasubramanian ........................ G06Q 10/107 |
| 2021/0160223 A1* | 5/2021 | Hwang ................ H04L 9/30 |
| 2021/0167964 A1* | 6/2021 | Fuerstner ............. G07F 7/084 |
| 2021/0168148 A1* | 6/2021 | Boodaei ............... H04L 63/0861 |
| 2021/0173905 A1* | 6/2021 | Kursun ................ G06N 3/045 |
| 2021/0174015 A1* | 6/2021 | Bhattacharya ........ G06N 3/044 |
| 2021/0174426 A1* | 6/2021 | Isaacson .............. G07G 1/14 |
| 2021/0176276 A1* | 6/2021 | Kursun ................ H04L 63/04 |
| 2021/0182098 A1* | 6/2021 | Wardell ............... G06F 16/9538 |
| 2021/0182496 A1* | 6/2021 | Shi ..................... G06F 40/30 |
| 2021/0191506 A1* | 6/2021 | Wang .................. G06F 3/017 |
| 2021/0192418 A1* | 6/2021 | Kishore ................ G06F 40/10 |
| 2021/0209480 A1* | 7/2021 | Wang .................. G06F 40/205 |
| 2021/0209513 A1* | 7/2021 | Torres .................. G06N 20/00 |
| 2021/0216726 A1* | 7/2021 | Qin ..................... G06N 3/045 |
| 2021/0224671 A1* | 7/2021 | Cristache .............. G06N 5/022 |
| 2021/0224799 A1* | 7/2021 | Ongpin ................ H04L 63/083 |
| 2021/0224818 A1* | 7/2021 | Choudhary ........... G06F 40/284 |
| 2021/0224975 A1* | 7/2021 | Ranca .................. G06V 10/82 |
| 2021/0226961 A1* | 7/2021 | Clark ................... G06F 9/5038 |
| 2021/0241231 A1* | 8/2021 | Mullins .............. G06Q 10/063118 |
| 2021/0241362 A1* | 8/2021 | Nguyen ............... G06Q 30/0643 |
| 2021/0241760 A1* | 8/2021 | Whalin ................ G10L 15/1822 |
| 2021/0248425 A1* | 8/2021 | Zong .................. G06F 18/2323 |
| 2021/0256052 A1* | 8/2021 | Luo .................... G06N 3/045 |
| 2021/0256417 A1* | 8/2021 | Kneller ............... G10L 15/1815 |
| 2021/0258428 A1* | 8/2021 | Fouquet .............. H04M 1/2535 |
| 2021/0266500 A1* | 8/2021 | Taylor ................ G06Q 40/03 |
| 2021/0286989 A1* | 9/2021 | Zhong ................. G06F 40/177 |
| 2021/0295822 A1* | 9/2021 | Tomkins .............. G06F 16/3323 |
| 2021/0303638 A1* | 9/2021 | Zhong ................. G06F 40/169 |
| 2021/0303798 A1* | 9/2021 | Duong ................. G06F 40/30 |
| 2021/0304075 A1* | 9/2021 | Duong ................. G10L 15/197 |
| 2021/0304149 A1* | 9/2021 | Al-Sinan ............. G06Q 10/0639 |
| 2021/0304297 A1* | 9/2021 | Al-Sinan ............. G06N 20/00 |
| 2021/0304733 A1* | 9/2021 | Jalaluddin ........... G10L 15/26 |
| 2021/0311973 A1* | 10/2021 | Radhakrishnan ..... G06F 40/30 |
| 2021/0312942 A1* | 10/2021 | Rudzicz ............... A61B 5/4803 |
| 2021/0319527 A1* | 10/2021 | Benkreira ............ G06Q 50/265 |

(56) References Cited

U.S. PATENT DOCUMENTS

| | | | |
|---|---|---|---|
| 2021/0326428 A1* | 10/2021 | Edwards | G06V 20/20 |
| 2021/0326799 A1* | 10/2021 | Leen | G06Q 10/063118 |
| 2021/0327413 A1* | 10/2021 | Suwandy | G06N 3/045 |
| 2021/0334823 A1* | 10/2021 | Warren | G06F 40/30 |
| 2021/0334921 A1* | 10/2021 | Austin | G06Q 10/063112 |
| 2021/0342361 A1* | 11/2021 | Radzewsky | G06F 16/23 |
| 2021/0342399 A1* | 11/2021 | Sisto | G06F 16/90332 |
| 2021/0342785 A1* | 11/2021 | Mann | G06F 40/186 |
| 2021/0350084 A1* | 11/2021 | Zhang | G06F 40/30 |
| 2021/0357378 A1* | 11/2021 | Urdiales | G06F 16/215 |
| 2021/0357766 A1* | 11/2021 | Paul | G06N 5/02 |
| 2021/0357835 A1* | 11/2021 | Modi | G06F 40/194 |
| 2021/0367778 A1* | 11/2021 | Hamel | G06F 16/27 |
| 2021/0374397 A1* | 12/2021 | Zeng | G06F 18/2148 |
| 2021/0375272 A1* | 12/2021 | Madwed | G06F 3/167 |
| 2021/0379758 A1* | 12/2021 | Chu | B25J 9/1661 |
| 2021/0383064 A1* | 12/2021 | Wang | G06F 40/166 |
| 2021/0390643 A1* | 12/2021 | Fairchild | G06F 21/32 |
| 2021/0390951 A1* | 12/2021 | Gadde | G06F 40/30 |
| 2021/0397984 A1* | 12/2021 | Sun | G06Q 30/0201 |
| 2021/0406836 A1* | 12/2021 | Bar-on | G06F 40/205 |
| 2021/0407504 A1* | 12/2021 | Colleen | G06N 5/02 |
| 2021/0407638 A1* | 12/2021 | Neumann | G16H 20/00 |
| 2021/0407679 A1* | 12/2021 | Liu | G16H 40/20 |
| 2022/0001549 A1* | 1/2022 | Vadayadiyil Raveendran | G06Q 10/06 |
| 2022/0009370 A1* | 1/2022 | Suhas Kulkarni | B60L 55/00 |
| 2022/0012352 A1* | 1/2022 | Boding | G06F 21/604 |
| 2022/0027745 A1* | 1/2022 | Podgorny | G06N 5/022 |
| 2022/0028371 A1* | 1/2022 | Xu | G10L 15/063 |
| 2022/0067439 A1* | 3/2022 | Zhang | G06F 18/217 |
| 2022/0076283 A1* | 3/2022 | Oliveira | H04L 51/216 |
| 2022/0084151 A1* | 3/2022 | Tripathi | G06Q 50/01 |
| 2022/0086131 A1* | 3/2022 | Kinai | G06N 20/00 |
| 2022/0092265 A1* | 3/2022 | Bhattacharya | G06F 40/117 |
| 2022/0092403 A1* | 3/2022 | Jiang | G06N 3/08 |
| 2022/0100772 A1* | 3/2022 | Kadarundalagi Raghura | G06F 21/6218 |
| 2022/0100963 A1* | 3/2022 | Anubhai | G06F 40/295 |
| 2022/0100967 A1* | 3/2022 | Pushkin | G06F 40/30 |
| 2022/0101839 A1* | 3/2022 | George | G06F 40/30 |
| 2022/0101844 A1* | 3/2022 | Yang | G10L 15/16 |
| 2022/0105944 A1* | 4/2022 | Ghannam | B60W 40/08 |
| 2022/0108086 A1* | 4/2022 | Wu | G06F 40/35 |
| 2022/0121809 A1* | 4/2022 | Bakman | H04M 1/72403 |
| 2022/0121820 A1* | 4/2022 | Chopra | G06F 16/35 |
| 2022/0129626 A1* | 4/2022 | Liu | G06F 40/20 |
| 2022/0129637 A1* | 4/2022 | Kohita | G06N 3/08 |
| 2022/0129766 A1* | 4/2022 | Potts | G06N 5/022 |
| 2022/0129917 A1* | 4/2022 | Sloat | G06Q 30/0201 |
| 2022/0156462 A1* | 5/2022 | Mcnamara | G06F 40/211 |
| 2022/0164643 A1* | 5/2022 | Charnock | G06N 3/04 |
| 2022/0166731 A1* | 5/2022 | Rey | G06Q 10/10 |
| 2022/0167163 A1* | 5/2022 | Dutt | H04W 12/126 |
| 2022/0172633 A1* | 6/2022 | Jha | G06T 15/00 |
| 2022/0180888 A1* | 6/2022 | Karri | G10L 17/06 |
| 2022/0199075 A1* | 6/2022 | Padmanabhan | H04L 41/16 |
| 2022/0207452 A1* | 6/2022 | Rorro | G06Q 10/06316 |
| 2022/0208182 A1* | 6/2022 | Zhang | G06F 40/35 |
| 2022/0210150 A1* | 6/2022 | Neubauer | H04W 4/02 |
| 2022/0222235 A1* | 7/2022 | Menghani | G06N 3/04 |
| 2022/0237635 A1* | 7/2022 | Das | G06Q 30/0202 |
| 2022/0238183 A1* | 7/2022 | Franco | C40B 30/04 |
| 2022/0239489 A1* | 7/2022 | Maruyama | H04L 9/3221 |
| 2022/0269589 A1* | 8/2022 | Aggarwal | G06F 11/3684 |
| 2022/0270721 A1* | 8/2022 | Schrempf | G16H 30/20 |
| 2022/0300924 A1* | 9/2022 | Mudumbai Srinivasa | G06K 7/1417 |
| 2022/0300970 A1* | 9/2022 | Mudumbai Srinivasa | G06K 19/06028 |
| 2022/0309230 A1* | 9/2022 | Lawrence | G06N 7/01 |
| 2022/0318499 A1* | 10/2022 | Xiao | H04L 51/046 |
| 2022/0318763 A1* | 10/2022 | Lee | G06Q 10/1097 |
| 2022/0327487 A1* | 10/2022 | Vontobel | G06N 3/045 |
| 2022/0343257 A1* | 10/2022 | Mohanty | G06F 40/30 |
| 2022/0358152 A1* | 11/2022 | Sultan | G06F 18/214 |
| 2022/0366427 A1* | 11/2022 | Stoops | G06N 5/022 |
| 2022/0374604 A1* | 11/2022 | Sivakumar | G06F 40/35 |
| 2022/0374605 A1* | 11/2022 | Sethi | G06F 1/3206 |
| 2022/0385703 A1* | 12/2022 | Joshi | H04L 51/02 |
| 2022/0399009 A1* | 12/2022 | Okada | G06F 16/9027 |
| 2022/0399023 A1* | 12/2022 | Gyanchandani | G10L 15/28 |
| 2022/0414340 A1* | 12/2022 | Zhang | G06F 40/35 |
| 2022/0414694 A1* | 12/2022 | Sokolovsky | G06F 40/279 |
| 2022/0415467 A1* | 12/2022 | Shin | G06V 30/19133 |
| 2022/0417238 A1* | 12/2022 | Maiman | H04L 63/102 |
| 2023/0004830 A1* | 1/2023 | Arevalo | G06N 3/0464 |
| 2023/0004972 A1* | 1/2023 | Rapowitz | G06Q 20/405 |
| 2023/0005603 A1* | 1/2023 | Rahman | A61B 5/14542 |
| 2023/0008868 A1* | 1/2023 | Ur | G06F 21/316 |
| 2023/0019006 A1* | 1/2023 | Villarroel Humérez | G05B 13/0265 |
| 2023/0020843 A1* | 1/2023 | Bowers | H04L 63/0861 |
| 2023/0024033 A1* | 1/2023 | Gaspardone | H04M 15/8016 |
| 2023/0033904 A1* | 2/2023 | Tokarev Sela | G06F 16/2455 |
| 2023/0037119 A1* | 2/2023 | Ganot | H04R 25/505 |
| 2023/0038940 A1* | 2/2023 | Barbe | H04L 63/083 |
| 2023/0052381 A1* | 2/2023 | Khalfan | G06Q 30/06 |
| 2023/0056672 A1* | 2/2023 | Kim | G06V 10/82 |
| 2023/0066957 A1* | 3/2023 | Gambon | G06Q 30/04 |
| 2023/0075023 A1* | 3/2023 | Zhu | G10L 15/30 |
| 2023/0098405 A1* | 3/2023 | Weisman-Smith | G07C 9/00896 340/5.65 |
| 2023/0098418 A1* | 3/2023 | Nagaraja | G05B 13/048 726/23 |
| 2023/0100264 A1* | 3/2023 | Baker | B60R 25/241 340/439 |
| 2023/0126720 A1* | 4/2023 | Kim | G06Q 20/3827 705/64 |
| 2023/0153136 A1* | 5/2023 | Dennis | G06F 21/31 717/115 |
| 2023/0153449 A1* | 5/2023 | Li | G06F 21/6218 726/4 |
| 2023/0162124 A1* | 5/2023 | Takahashi | G06Q 10/06395 705/7.41 |
| 2023/0179622 A1* | 6/2023 | Underwood | H04L 63/1433 726/25 |
| 2023/0198764 A1* | 6/2023 | Panicker | H04L 9/3271 713/168 |
| 2023/0237504 A1* | 7/2023 | Porter | G06Q 30/018 705/317 |
| 2023/0245552 A1* | 8/2023 | Lewis | G06Q 50/265 455/404.2 |
| 2023/0254699 A1* | 8/2023 | Chaudhary | H04W 12/72 455/411 |
| 2023/0262054 A1* | 8/2023 | Marasco | H04L 63/0861 726/4 |
| 2023/0274085 A1* | 8/2023 | Su | G06F 40/30 704/9 |
| 2023/0275766 A1* | 8/2023 | Wagner | H04L 9/3255 713/176 |
| 2023/0298015 A1* | 9/2023 | Kiraz | H04L 9/0861 |
| 2023/0316101 A1* | 10/2023 | Pan | G06F 40/284 |
| 2023/0317257 A1* | 10/2023 | Kim | G06N 3/045 705/2 |
| 2023/0352189 A1* | 11/2023 | Sun | H04L 9/3218 |
| 2023/0359736 A1* | 11/2023 | Deen | G06F 21/566 |
| 2023/0360027 A1* | 11/2023 | Jain | H04L 9/50 |
| 2023/0360159 A1* | 11/2023 | Leng | G06Q 50/205 |
| 2024/0005351 A1* | 1/2024 | Sakamoto | G06F 21/64 |
| 2024/0021100 A1* | 1/2024 | Glaser | G09B 19/167 |
| 2024/0033648 A1* | 2/2024 | Johnston | G06V 20/42 |
| 2024/0070234 A1* | 2/2024 | Wells | H04L 9/50 |
| 2024/0093267 A1* | 3/2024 | Hsieh | G01N 35/00732 |
| 2024/0095617 A1* | 3/2024 | Edwards | G06Q 10/063112 |
| 2024/0110806 A1* | 4/2024 | Bahnsen | G01C 21/3602 |
| 2024/0114037 A1* | 4/2024 | Todasco | H04L 63/083 |
| 2024/0146734 A1* | 5/2024 | Southgate | G06F 21/6227 |
| 2024/0161071 A1* | 5/2024 | Gnap | G06Q 20/3827 |
| 2024/0171402 A1* | 5/2024 | Ramezan | H04L 9/3218 |
| 2024/0177082 A1* | 5/2024 | Leedom | G01N 35/00871 |
| 2024/0185096 A1* | 6/2024 | Zhang | G06F 16/9535 |

(56) References Cited

U.S. PATENT DOCUMENTS

| | | | |
|---|---|---|---|
| 2024/0202460 A1* | 6/2024 | Schillace | G06F 40/40 |
| 2024/0205013 A1* | 6/2024 | Sorniotti | H04L 9/3231 |
| 2024/0211949 A1* | 6/2024 | Edwards | G06Q 30/0607 |
| 2024/0236094 A1* | 7/2024 | Beaver | H04L 63/10 |
| 2024/0242625 A1* | 7/2024 | Reyna | G09B 19/06 |
| 2024/0249189 A1* | 7/2024 | Wang | B25J 9/163 |
| 2024/0268762 A1* | 8/2024 | Reiner | A61B 1/00016 |
| 2024/0289255 A1* | 8/2024 | Mendelowitz | G06F 21/577 |
| 2024/0303305 A1* | 9/2024 | Chan | G06F 21/316 |
| 2024/0331469 A1* | 10/2024 | Moshe | G07C 9/00174 |
| 2024/0341244 A1* | 10/2024 | Kim | A01G 9/24 |
| 2024/0345832 A1* | 10/2024 | Iruvanti | G06F 8/71 |
| 2024/0370837 A1* | 11/2024 | Rozovski | G06Q 20/102 |
| 2024/0371208 A1* | 11/2024 | Igrec | G07B 11/00 |
| 2024/0378067 A1* | 11/2024 | Bakshi | H04L 9/50 |
| 2024/0379101 A1* | 11/2024 | Bhuwalka | G06F 3/167 |
| 2024/0395159 A1* | 11/2024 | Chang | G06F 40/30 |
| 2024/0412168 A1* | 12/2024 | Shrader | G06N 5/048 |
| 2025/0013655 A1* | 1/2025 | Mohanty | G06F 16/258 |

OTHER PUBLICATIONS

Zhao et al "Understanding Smartphone Sensor and App Data for Enhancing the Security of Secret Questions," IEEE Transactions on Mobile Computing, vol. 16, No. 2, pp. 552-565 (Year: 2017).*

Kim et al "General Authentication Scheme in User-Centric IdM," ICACT 2016, pp. 737-740 (Year: 2016).*

Ren et al "A Novel Dynamic User Authentication Scheme," 2012 International Symposium on Communications and Information Technologies (ISCIT), IEEE, pp. 713-717 (Year: 2012).*

Ren et al "A Novel Dynamic User Authentication Scheme," 2012 International Symposium on Communications and Information Technologies, IEEE, pp. 713-717 (Year: 2012).*

Park et al "A Secure Remote User Authentication Scheme," Third 2008 International Conference on Convergence and Hybrid Information Technology, IEEE Computer Society, pp. 368-373 (Year: 2008).*

* cited by examiner

USER AUTHENTICATION DEVICE, USER AUTHENTICATION METHOD, AND USER AUTHENTICATION COMPUTER PROGRAM

BACKGROUND OF THE INVENTION

1. Field of the Invention

The present invention relates to a user authentication device, a user authentication method, and a user authentication computer program.

2. Description of the Related Art

The general problem coped with by a current user authentication method is to authenticate a person with high safety using an application (at the time of log in a computer network, for example).

Two-element authentication is a technique established to confirm the identity of a user. For this practical use, the second authentication method is required to satisfy the followings:

The method is safe and constantly available.
The method suppresses a burden to the minimum (to be entertaining if possible).

Any of the methods being used today does not satisfy all of the above-described standards. Moreover, it is considerably preferable to authenticate a user on user's channel.

Most of the two-element authentication methods include, as at least one element, a biometric authentication process. For this function, one method trusts the other method. For example, it is difficult to confirm that a photo is taken at the time and that a photo is not a copy (of a screen or a piece of paper as the means conducted by hackers in the past). Every time the authentication method is improved to be safer, a new problem tends to appear.

U.S. patent application No. 2015/0096002 (Method of Criminal Profiling and Person Identification Using Cognitive/Behavioral Biometric Fingerprint Analysis) discloses a use of cognitive/behavioral identification information for identifying a criminal psychological state (see U.S. patent application No. US 2015/0096002). As a solution in this patent literature, a fingerprint at the time of a criminal behavior is formed for a general user (the fingerprint is formed while a user is showing a criminal behavior).

U.S. patent application No. 2013/0185071 (VERIFYING A USER) discloses the determination of a response time by a speech ability using voice transition patterns (see U.S. patent application No. US 2015/0096002). The solution in this patent literature is a solution by biometric voice authentication.

SUMMARY OF THE INVENTION

It is an object of the present invention to at least partially solve the problems in the conventional technology.

However, the above-described conventional techniques do not enable, in two-element authentication, user authentication with higher accuracy. This is because the above-described conventional techniques have the following problems.

First, U.S. patent application No. 2015/0096002 discloses a use of cognitive/behavioral identification information for identifying a criminal physical state, while it does not disclose a solution for identifying a person.

Second, U.S. patent application No. 2013/0185071 discloses the determination of a response time by a speech ability using voice transition patterns, while it does not measure an online response time for a problem requiring a specific skill.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following will specifically describe the user authentication device, the user authentication method, and the user authentication computer program according to the invention, with reference to the enclosed drawings. Note that the invention is not limited to the embodiment described in the following.

First Embodiment

The following will sequentially describe a configuration of the user authentication system, a configuration of the user authentication device, a concrete example of the user authentication processing, a flow of the entire user authentication processing, and a flow of the user authentication determination processing, and will lastly describe the effects of the embodiment.

Configuration of User Authentication System

Figure 1:
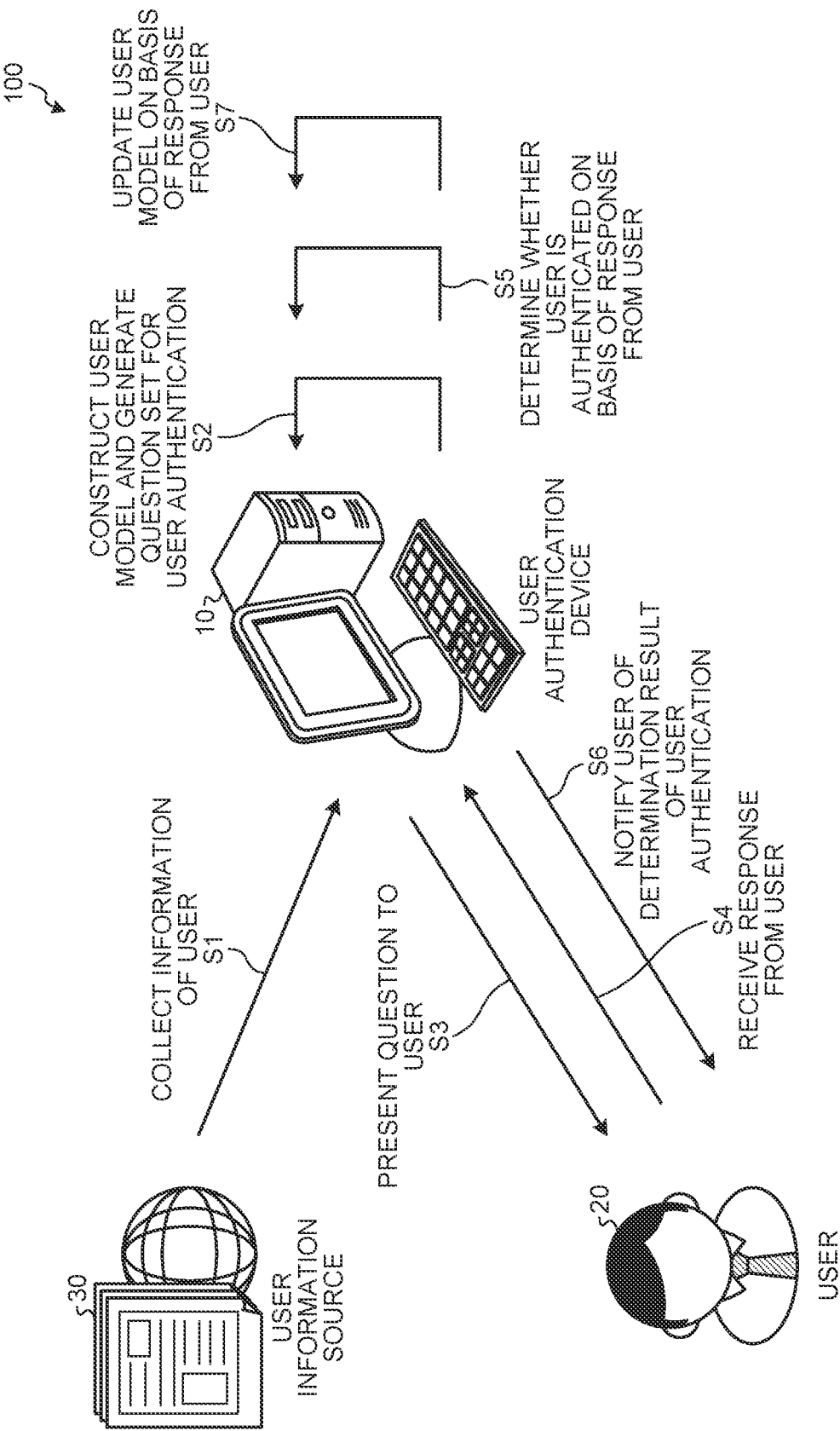
FIG. 1 is a diagram illustrating an example of a user authentication system according to a first embodiment.

The following will specifically describe a configuration of a user authentication system (appropriately referred to as this system) 100 according to the first embodiment, with reference to FIG. 1. FIG. 1 is a diagram illustrating a configuration example of a user authentication system according to the first embodiment. This system 100 includes a user authentication device 10, a user 20, and a user information source 30. Here, the user authentication device 10, the user 20, and the user information source 30 are connected to be communicable wiredly or wirelessly through a given communication network (not illustrated). Note that the user authentication system illustrated in FIG. 1 may include a plurality of user information sources 30.

First, the user authentication device 10 collects information of the user 20 from the user information source 30 (Step S1). Next, in accordance with the collected information of the user 20, the user authentication device 10 constructs a skill model of the user 20 (appropriately referred to as a "user skill model", a "user model", or a "model"), and generates a question set for authenticating the user 20 (Step S2).

The above-described Steps S1 and S2 are steps for generating, with the use of the authentication system, a model for each user regarding the ability (appropriately referred to as a "user skill") of solving a complicated but simple task (appropriately referred to as a "question" or a "problem"). Such a model is constructed first in accordance with the background of the user 20 (for example, a Mathematical Olympiad participant, a musician, or the like). After various authentication problems, the model is constantly refined for each user by a machine learning method. Moreover, the model learns how the user 20 copes with the task.

Furthermore, in the above-described Steps S1 and S2, the user authentication device 10 generates a question/problem for the user 20 so as to test a response time and the characteristics at the time of solving the problem of the user 20, and similarly generates other indices related to the question.

Then, the user authentication device 10 presents the question to the user 20 (Step S3), and receives a response from the user 20 (Step S4). Here, the user authentication device 10 determines the authentication of the user 20 on the basis of the response from the user 20 (Step S5).

In the above-described Step S3 to Step S5, if the response time and the characteristics at the time of solving the problem of the user are within model parameters, the user 20 is authenticated. Otherwise, the user 20 may be tested further or warned. In this manner, when the user 20 intends to log in a network or the like or when the user 20 intends to access specific data or the like with high confidentiality, it is possible to confirm the identity of the user 20. Note that the details of the user authentication determination processing will be described later in "Flow of user authentication determination processing".

Then, the user authentication device 10 notifies the user 20 of a determination result of the user 20 (Step S6). Furthermore, the user authentication device 10 updates the skill model of the user 20 on the basis of the response from the user 20 (Step S7).

In the above-described Step S7, it is possible to refine, by an unsupervised machine learning method, a model regarding the ability of the user 20 for solving a task within a domain, on the basis of the response time of the user 20, the accuracy of the result, and other parameters.

The above-described user authentication system 100 according to the first embodiment constructs a signature such as a predicted response time required for a person to perform a complicated task, and is a new authentication technique that can be used as the second authentication method of the two-element authentication. For example, unlike the authentication technique of the above-described U.S. patent application No. 2015/0096002, this system 100 can construct a model regarding a user skill, and present a question with a different difficulty level generated by artificial intelligence (AI) in accordance with a specific user so as to authenticate the specific user. Moreover, unlike the authentication technique of the above-described U.S. patent application No. 2013/0185071, this system 100 can perform processing based on user modeling using behavioral analysis and skill-based behaviors. Furthermore, this system 100 authenticates a user on a network, and constructs a skill model unique to each regular user, thus enabling user authentication with higher accuracy.

Configuration of User Authentication Device

Figure 2:
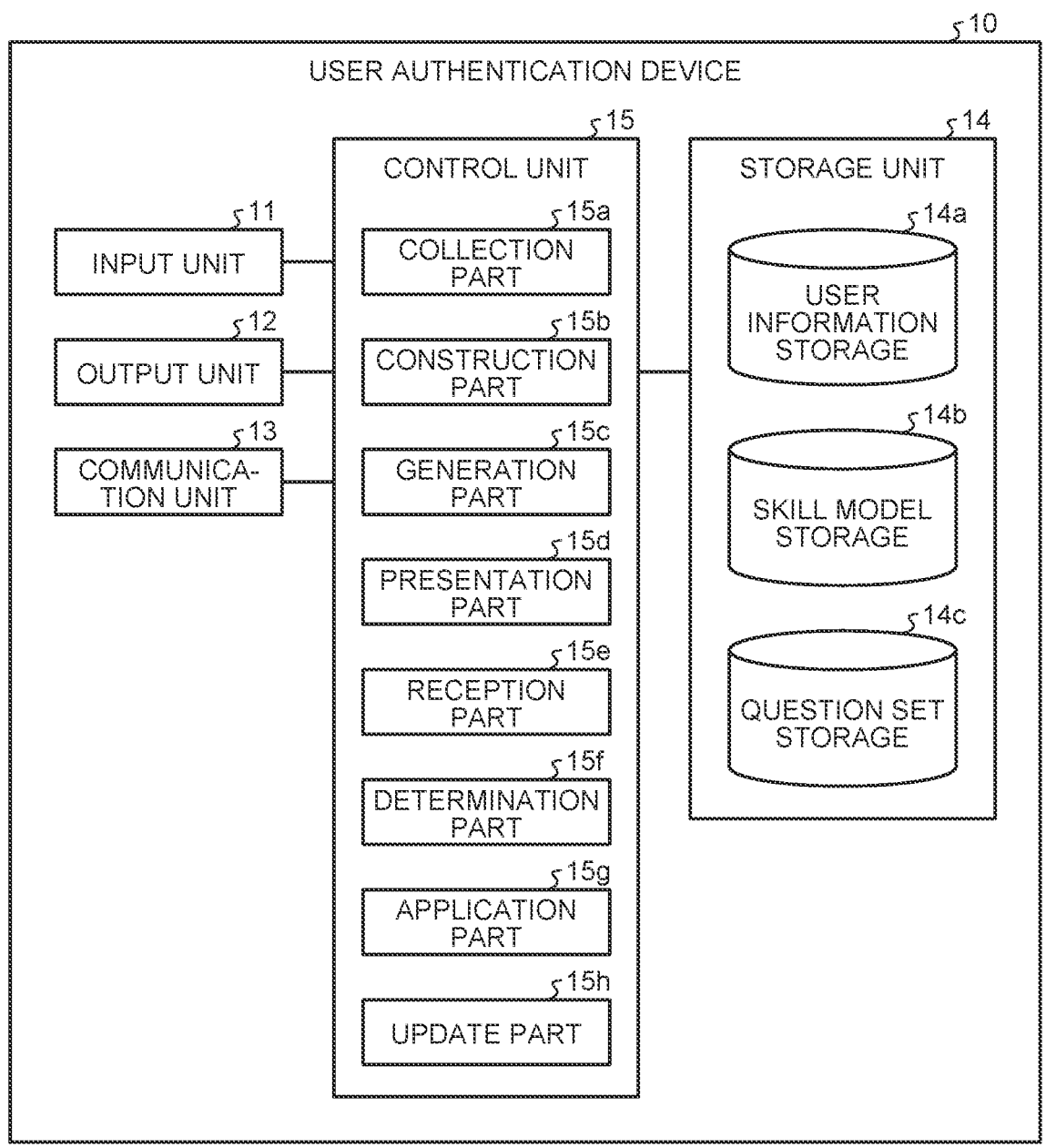
FIG. 2 is a block diagram illustrating a configuration example of a user authentication device according to the first embodiment.

The following will specifically describe the configuration of the user authentication device 10 according to the first embodiment with reference to FIG. 2. FIG. 2 is a block diagram illustrating a configuration example of the user authentication device according to the first embodiment. The user authentication device 10 includes an input unit 11, an output unit 12, a communication unit 13, a storage unit 14, and a control unit 15.

The input unit 11 controls input of various kinds of information to the user authentication device 10. The input unit 11 is, for example, a mouse, a keyboard, or the like, and receives input of setting information and the like to the user authentication device 10. Moreover, the output unit 12 controls output of various kinds of information from the user authentication device 10. The output unit 12 is, for example, a display or the like, and outputs setting information and the like stored in the user authentication device 10.

The communication unit 13 controls data communication with other devices. For example, the communication unit 13 performs data communication with communication devices. Moreover, the communication unit 13 can perform data communication with an operator terminal (not illustrated).

The storage unit 14 stores various kinds of information referred to by the control unit 15 for operation and various kinds of information obtained by the control unit 15 during operation. The storage unit 14 includes a user information storage 14*a*, a skill model storage 14*b*, and a question set storage 14*c*. Here, the storage unit 14 is, for example, a random access memory (RAM), a semiconductor memory element such as a flash memory, or a storage device such as a hard disk or an optical disk. Note that although the storage unit 14 is provided in the user authentication device 10 in the example of FIG. 2, the storage unit 14 may be provided outside the user authentication device 10, or a plurality of storage units may be provided.

The user information storage 14*a* stores information related to a resume of the user 20, a hobby of the user 20, a skill of the user 20, and the like that are collected from the user information source 30. Moreover, the skill model storage 14*b* stores information related to a skill model constructed for each user. Moreover, the question set storage 14*c* stores a plurality of questions and correct answers generated for each user.

The control unit 15 controls the entire user authentication device 10. The control unit 15 includes a collection part 15*a*, a construction part 15*b*, a generation part 15*c*, a presentation part 15*d*, a reception part 15*e*, a determination part 15*f*, an application part 15*g*, and an update part 15*h*. Here, the control unit 15 is, for example, an electronic circuit such as a central processing unit (CPU) or a micro processing unit (MPU) or an integrated circuit such as an application specific integrated circuit (ASIC) or a field programmable gate array (FPGA).

The collection part 15*a* collects information of the user 20. For example, the collection part 15*a* collects information of the user 20 using text analysis, natural language processing, or semantic analysis. The collection part 15*a* also collects information of the user 20 by analyzing the user information source 30 such as a resume, a LinkedIn, and ResearchGate of the user 20, and a nonprofessional social network such as Facebook including information of hobbies and other skills of the user 20. Meanwhile, the collection part 15*a* stores the collected information of the user 20 in the user information storage 14*a*.

The construction part 15*b* constructs a skill model of the user 20 using the information of the user 20 collected by the collection part 15*a*. For example, the construction part 15*b* constructs an initial model regarding a problem-solving skill of the user 20, using all of the information of the user 20 collected by the collection part 15*a* and a general-purpose model preliminarily constructed by the construction part 15b and then refined. Meanwhile, the construction part 15b stores the information related to the constructed skill model of the user 20 in the skill model storage 14b.

The generation part 15c generates a question for the user 20 on the basis of the information of the user 20 collected by the collection part 15a and the skill model of the user 20. For example, the generation part 15c generates, as a question for the user 20, a numerical question, a mathematic question, a physical question, a mechanical question, a reading exercise, or a speed chess. The generation part 15c also generates a question set for user authentication on the basis of the skill model of the user 20, and predicts time required for the user 20 to answer the questions correctly. Meanwhile, the generation part 15c stores, in the question set storage 14c, the generated question set, and the predicted time required for the user 20 to answer the questions correctly.

The presentation part 15d presents a question for the user 20 generated by the generation part 15c to the user 20. If a response to the question does not satisfy a given condition, the presentation part 15d presents another question to the user 20. For example, if the response time of the user 20 or the accuracy deviates largely from a predicted range, the presentation part 15d further presents one or more different questions to the user 20.

The reception part 15e receives, from the user 20, a response to the question presented by the presentation part 15d. For example, the reception part 15e receives, as a response to a question, an answer to the question, a response time, and the characteristics at the time of solving the question. Meanwhile, the reception part 15e may store the received various kinds of information in the storage unit 14.

The determination part 15f determines authentication of the user 20 on the basis of the response received by the reception part 15e. For example, if the accuracy of an answer to the question, the response time, and the characteristics at the time of solving the question are within a range of parameters set by the skill model of the user 20, the determination part 15f determines that the authentication of the user 20 is successful. If one of the accuracy of an answer to the question, the response time, and the characteristics at the time of solving the question is out of a range of parameters set by the skill model of the user 20, the determination part 15f determines that the authentication of the user 20 is failed.

If a response to the question does not satisfy a given condition, the application part 15g applies a given flag to the response to the question. For example, if the determination part 15f has determined that the authentication of the user 20 is failed, the application part 15g applies a flag indicating that a user is suspicious to the response of the user 20. Moreover, if the response time of the user 20 or the accuracy deviates largely from the predicted range, the application part 15g applies a flag indicating that a problem exists in cognitive ability to the response of the user 20. Meanwhile, the application part 15g may store the information related to the applied flag in the storage unit 14. The application part 15g may also transmit the information related to the applied flag to the user 20 and a system administrator.

The update part 15h updates a skill model of the user 20 on the basis of the response to the question received by the reception part 15e. For example, the update part 15h inputs, as data, the accuracy of an answer to the question, the response time, or the characteristics at the time of solving the question of the user 20, and updates the skill model of the user 20 using an unsupervised machine learning method. The update part 15h may also input the information of the user 20 newly collected by the collection part 15a and update the skill model of the user 20.

Concrete Example of User Authentication Processing

The following will describe concrete examples of the user authentication processing according to the first embodiment. The following will describe the concrete example 1 to the concrete example 3. However, the embodiment does not limit to the following concrete examples.

Concrete Example 1

In the first embodiment, the accuracy of a model regarding the problem-solving ability of each user can be improved constantly. In the following concrete example, there will be described processing of improving the accuracy of a model by increasing the number of dimensions used.

First, in the processing of the concrete example 1, the user authentication device 10 uses a plurality of domains for each user and constructs super space of user ability over such domains. For example, the user authentication device 10 constructs, as constructed super space of user ability, super space of numerical questions, chess problems, inference problems, and the like.

Moreover, in the processing of the concrete example 1, the user authentication device 10 can add the number of dimensions of skills acquired by the user 20 at a workplace. For example, the user authentication device 10 can ask a network system administrator of a company a question about a consequence predicted when a specific network component of a network managed by the administrator is changed. The user authentication device 10 can also generate arithmetic questions with high complicity for an accountant.

As described above, in the processing of the concrete example 1, the user authentication device 10 increases the number of dimensions used and keeps refining, with every authentication question, a model for each user by machine learning. Therefore, even if an attacker solves the same task as the user 20, the attacker needs to solve the task in the same way as the user 20 in the same time frame. For example, a chess problem can be solved in various ways, and the specific way of solving the problem by the user is grasped. Thus, if the way of solving the problem is different, a flag is applied. In this manner, the accuracy of user authentication is improved, thereby making it difficult for an intruder to pretend to be a true user.

Concrete Example 2

In the following concrete example, there will be described processing using a reading exercise as a different task example, which is in the same category as the above-described processing. In the processing of the concrete example 2, the user authentication device 10 generates a sample text, and observes the movement of the eyes of the user 20 reading the text, with a camera provided in the device (laptop or mobile). Here, each person has an extremely different pattern of eye movement during reading a text on a screen, and the pattern may differ also depending on reading ability, reading comprehension, and reading habit of each user.

The user authentication device 10 constructs a model regarding the eye movement of the user 20 during reading a text, improves the model by observing the user 20 reading a text, and adjusts the model by a machine learning method. The user authentication device 10 then uses such a model so as to determine a user to be authenticated on a network. The possibility that a swindler can imitate even the eye movement of the user 20 is low. Thus, with the processing of the concrete example 2, it is possible to protect the system from deepfake being used increasingly by hackers.

The above-described concrete example 1 and concrete example 2 are acting solutions constantly improving access monitoring in a single channel, and are methods considerably difficult for an attacker to break. More importantly, the method is difficult to break by automatic attacks. That is, if a response is excessively quick or slow, a flag is applied as suspicious, and thus simply knowing an answer is not enough.

Concrete Example 3

In the following concrete example, there will be described processing of thoroughly checking the intelligence of a user to be authenticated. For example, in a case of a system administrator or a programmer under the influence of alcohol or drugs, a problem in cognitive ability appears in an answer to a question. In the processing of the concrete example 3, if such a response is received, the user authentication device 10 applies such information as a flag to the response. Therefore, with the processing of the concrete example 3, it is possible to prevent unintentional damages to a network or a product of a company.

Flow of Entire User Authentication Processing

Figure 3:
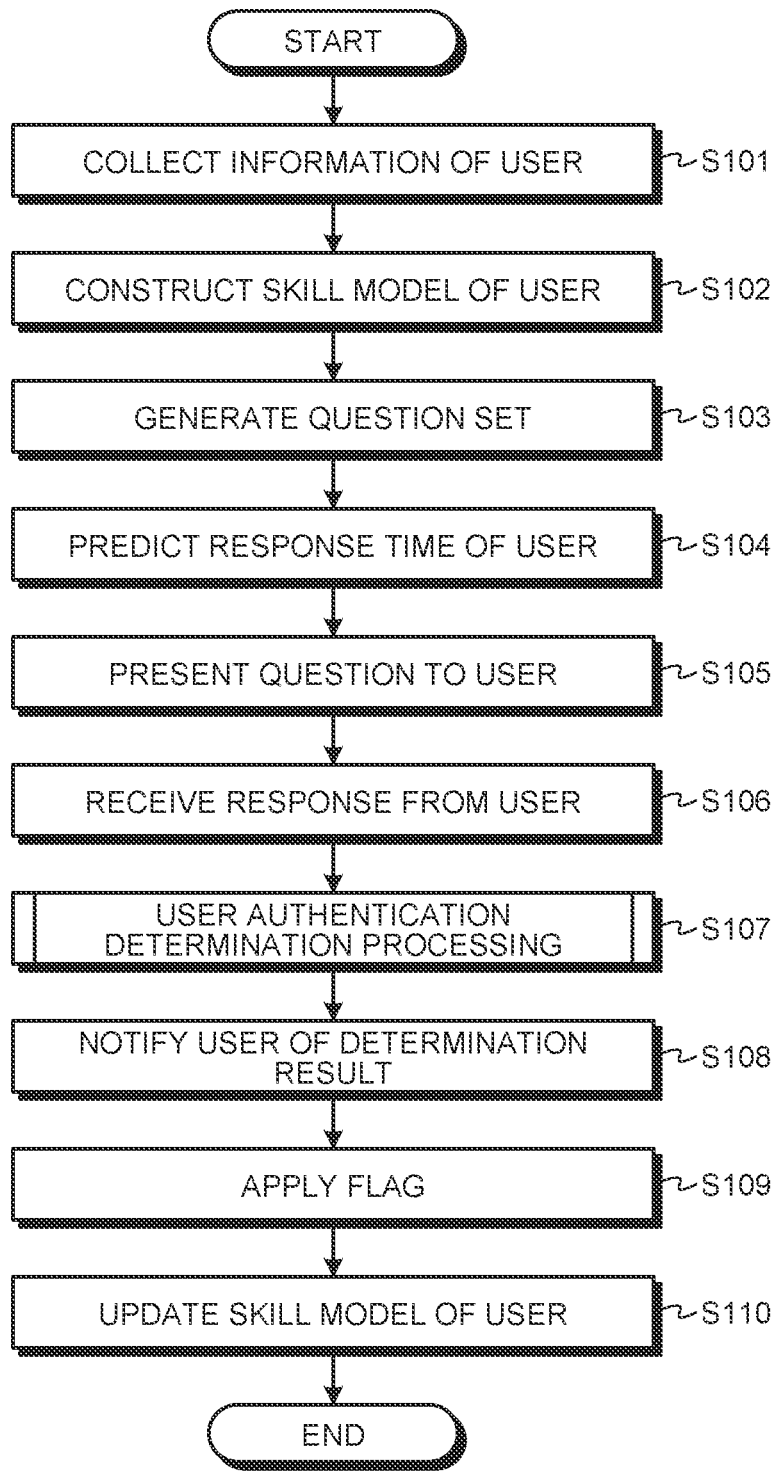
FIG. 3 is a flowchart illustrating an example of a flow of the entire user authentication processing according to the first embodiment.

The following will specifically describe a flow of the entire user authentication processing according to the first embodiment with reference to FIG. 3. FIG. 3 is a flowchart illustrating an example of a flow of the entire user authentication processing according to the first embodiment.

First, the collection part 15a of the user authentication device 10 collects information of the user 20 from the user information source 30 (Step S101). Here, the collection part 15a may obtain the information of the user 20 from the user information storage 14a of the storage unit 14.

Next, the construction part 15b constructs a skill model of the user 20 using the information of the user 20 collected by the collection part 15a (Step S102). Here, the construction part 15b may construct the skill model of the user 20 using the information of the user 20 stored in the user information storage 14a. Note that the user authentication device 10 may obtain a skill model of the user 20 constructed by another device.

Subsequently, the generation part 15c generates a question set including questions (problems) for the user 20 and correct answers on the basis of the information of the user 20 collected by the collection part 15a and the skill model of the user 20 (Steps S103). Here, the generation part 15c generates, using the skill model of the user 20, a problem required to be solved within a few seconds by the user 20. However, the time required for response is not especially limited. For example, if a problem is an entertaining game, the generation part 15c may generate a problem required to be solved within a longer time.

Moreover, the generation part 15c predicts a time required for the user 20 to respond to a question (response time) on the basis of the skill model of the user 20 (Step S104). Here, the generation part 15c may predict the characteristics at the time of solving a question of the user 20, on the basis of the skill model of the user 20.

Then, the presentation part 15d presents the question for the user 20 generated by the generation part 15c to the user 20 (Step S105). Here, the presentation part 15d may present the question for the user 20 in a form of text data or image data through the output unit 12, or present the question for the user 20 in a form of voice data through the output unit 12.

Moreover, the reception part 15e receives, from the user 20, a response to the question presented by the presentation part 15d (Step S106). Here, the reception part 15e may receive the response to the question in a form of text data or image data through the input unit 11, or receive the response to the question in a form of voice data through the output unit 11.

Thereafter, the determination part 15f determines authentication of the user 20 on the basis of the response received by the reception part 15e (Step S107). The details of the user authentication determination processing by the determination part 15f will be described later in "Flow of user authentication determination processing". Moreover, the determination part 15f notifies the user 20 of a determination result of whether the authentication is successful, for example (Step S108). Here, the determination part 15f may notify the user 20 of the determination result through the output unit 12 or transmit the determination result to the terminal of the user 20 or a system administrator through the communication unit 13.

Moreover, if the response to the question does not satisfy a given condition, the application part 15g applies a given flag to the response to the question (Step S109). Here, the application part 15g applies a flag indicating that a user is suspicious, a flag indicating that a problem exists in cognitive ability of the user 20, or the like. However, the kind of a flag is not especially limited.

Lastly, the update part 15h updates the skill model of the user 20 on the basis of the response to the question received by the reception part 15e (Step S110), and finishes processing. Note that the processing at Step S110 may be performed before the processing at Step S107.

Flow of User Authentication Determination Processing

Figure 4:
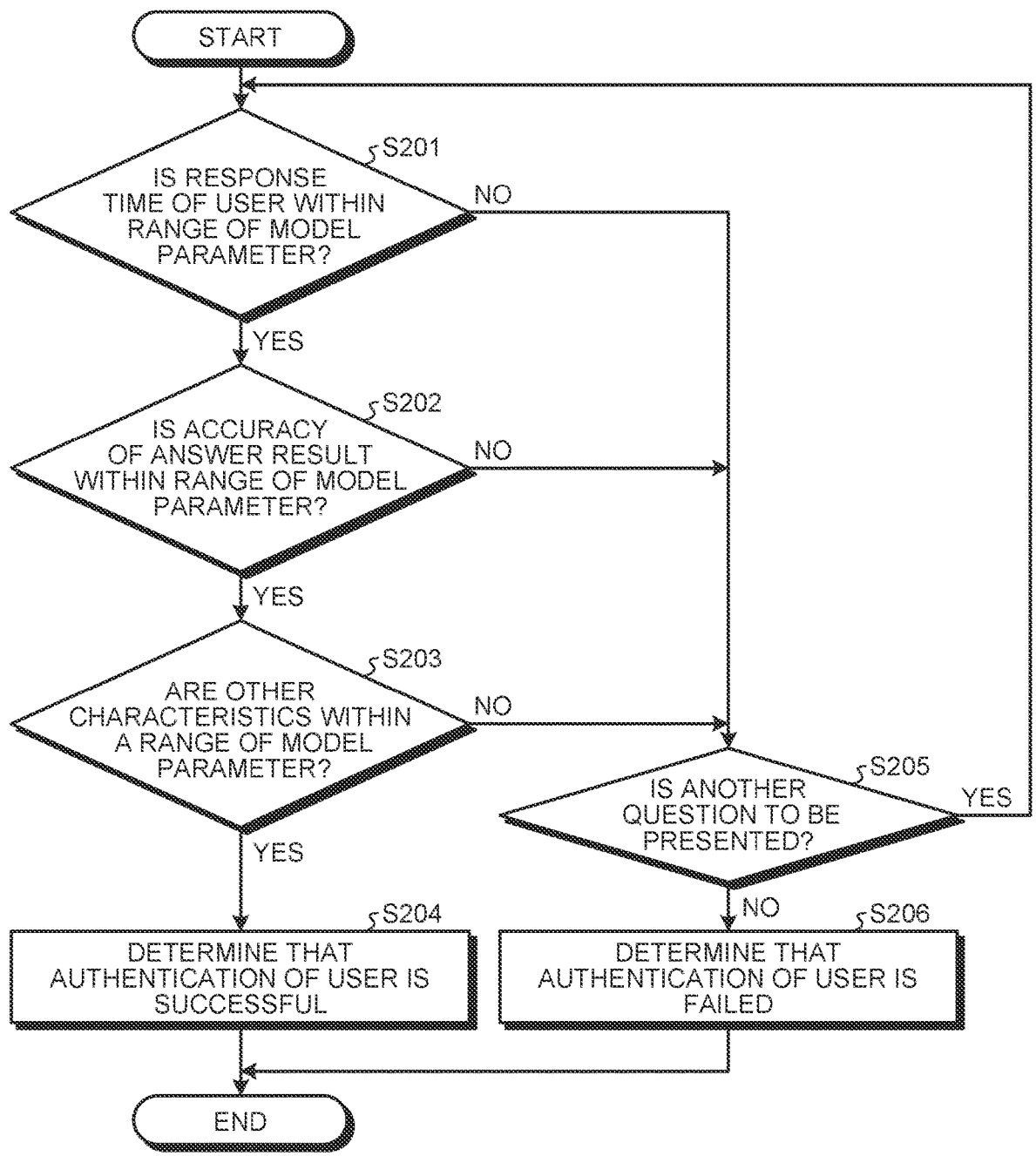
FIG. 4 is a flowchart illustrating an example of a flow of user authentication determination processing according to the first embodiment.

The following will specifically describe a flow of the user authentication determination processing according to the first embodiment with reference to FIG. 4. FIG. 4 is a flowchart illustrating an example of a flow of the user authentication determination processing according to the first embodiment. First, the determination part 15f of the user authentication device 10 extracts an answer to a question, a response time, and characteristics at the time of solving the question, which are included in the response received by the reception part 15e. The determination part 15f performs the following processing of Steps S201 to S203 and determines authentication of the user 20.

First, the determination part 15f determines whether the extracted response time of the user 20 is within a range of a model parameter of an expected range (Step S201). Here, if the response time is within the model parameter (Yes at Step S201), the processing is shifted to Step S202. In contrast, if the response time is not within the model parameter (No at Step S201), the processing is shifted to Step S205.

Secondly, the determination part 15f determines whether the accuracy of the extracted answer result of the user 20 is within a range of a model parameter of an expected range (Step S202). Here, if the accuracy of the answer result is within the model parameter (Yes at Step S202), the processing is shifted to Step S203. In contrast, if the accuracy of the answer result is not within the model parameter (No at Step S202), the processing is shifted to Step S205.

Thirdly, the determination part 15f determines whether the extracted other characteristics (characteristics at the time of solving the problem) of the user 20 are within a range of a model parameter of an expected range (Step S203). Here, if the other characteristics are within the model parameter (Yes at Step S203), the processing is shifted to Step S204. In contrast, if the accuracy of the result is not within the model parameter (No at Step S203), the processing is shifted to Step S205.

If numerical values based on all of the responses are within the model parameters in the processing of Step S201 to S203, the determination part 15f determines that the authentication of the user 20 is successful (Step S204), and finishes processing. Note that the determination part 15f can also perform the processing of Step S201 to S203 in a different order.

In contrast, if any one of numerical values based on all of the responses is not within the model parameter in the processing of Step S201 to S203, the determination part 15f determines whether another question is to be presented to the user 20 (Step S205). If another question is to be presented to the user 20 (Yes at Step S205), the processing is shifted to Step S201 where the determination part 15f performs processing again on an answer to a new question. If another question is not to be presented to the user 20 (No at Step S205), the determination part 15f determines that the authentication of the user 20 is failed (Step S206), and the processing is finished.

Here, if the response time, the accuracy, or other characteristics of the user 20 deviates largely from the model parameter of an expected range, the application part 15g applies a flag indicating that the user 20 is suspicious. Moreover, if the user 20 is suspicious, the presentation part 15d may allow the user to solve one or more problems before taking some actions such as warning. If the user 20 is suspicious, the determination part 15f may also warn the user 20 immediately after the first question. Note that a security system administrator or the like can change settings of the kind of warning issued by the determination part 15f and the situation in which a warning is issued.

Effects of First Embodiment

First, in the user authentication processing according to the above-described first embodiment, the information of a user is collected, and a question for the user is generated on the basis of the collected information of the user and a skill model of the user. The generated question for the user is presented to the user, and a response to the presented question is received from the user. Then, the authentication of the user is determined on the basis of the received response. In this manner, this processing enables, in the two-element authentication, user authentication with higher accuracy.

Secondly, in the above-described user authentication processing according to the first embodiment, the information of the user is collected using text analysis, natural language processing, or semantic analysis. In this manner, more detailed information of the user is collected, whereby this processing enables, in the two-element authentication, user authentication with higher accuracy.

Thirdly, in the above-described user authentication processing according to the first embodiment, a skill model of the user is constructed using the collected information of the user. In this manner, a more effective skill model of the user is constructed, whereby this processing enables, in the two-element authentication, user authentication with higher accuracy.

Fourthly, in the above-described user authentication processing according to the first embodiment, there is generated, as a question for a user, a numerical question, a mathematic question, a physical question, a mechanical question, a reading exercise, or a speed chess. In this manner, a more effective question for a user is generated, whereby this processing enables, in the two-element authentication, user authentication with higher accuracy.

Fifthly, in the above-described user authentication processing according to the first embodiment, if an answer to a question does not satisfy a given condition, another question is presented to the user. In this manner, a plurality of questions are presented to a suspicious user, whereby this processing enables, in the two-element authentication, user authentication with higher accuracy.

Sixthly, in the above-described user authentication processing according to the first embodiment, if the accuracy of an answer to a question, the response time, and the characteristics at the time of solving the question of the user are within a range of parameters set by the skill model of the user, it is determined that the authentication of the user is successful. In this manner, the response of the user is determined more effectively, whereby this processing enables, in the two-element authentication, authentication with higher accuracy.

Seventhly, in the above-described user authentication processing according to the first embodiment, if a response to a question does not satisfy a given condition, a given flag is applied to the response to the question. In this manner, the response of the user is determined more specifically, whereby this processing enables, in the two-element authentication, authentication with higher accuracy.

Eighthly, in the above-described user authentication processing according to the first embodiment, the skill model of the user is updated on the basis of a received response to a question. In this manner, the skill model is refined at every user authentication processing, whereby this processing enables, in the two-element authentication, user authentication with higher accuracy.

The invention enables, in the two-element authentication, user authentication with high accuracy.

Computer Program

A computer program that describes processing executed by the user authentication device 10 according to the embodiment in a computer-executable language can be created. As one embodiment, the user authentication device 10 can be implemented by installing a user authentication computer program that executes the user authentication processing described above as packaged software and online software into a desired computer. For example, by causing an information-processing device to execute the user authentication computer program described above, the information-processing device can function as the user authentication device 10. The information-processing device mentioned here includes a desktop or a laptop personal computer. Besides, mobile communication terminals such as a smartphone, a mobile phone, and a personal handyphone system (PHS), slate terminals such as a personal digital assistant (PDA), and the like are in the category of the information-processing device. In addition, functions of the user authentication device 10 may be implemented in a cloud server.

Figure 5:
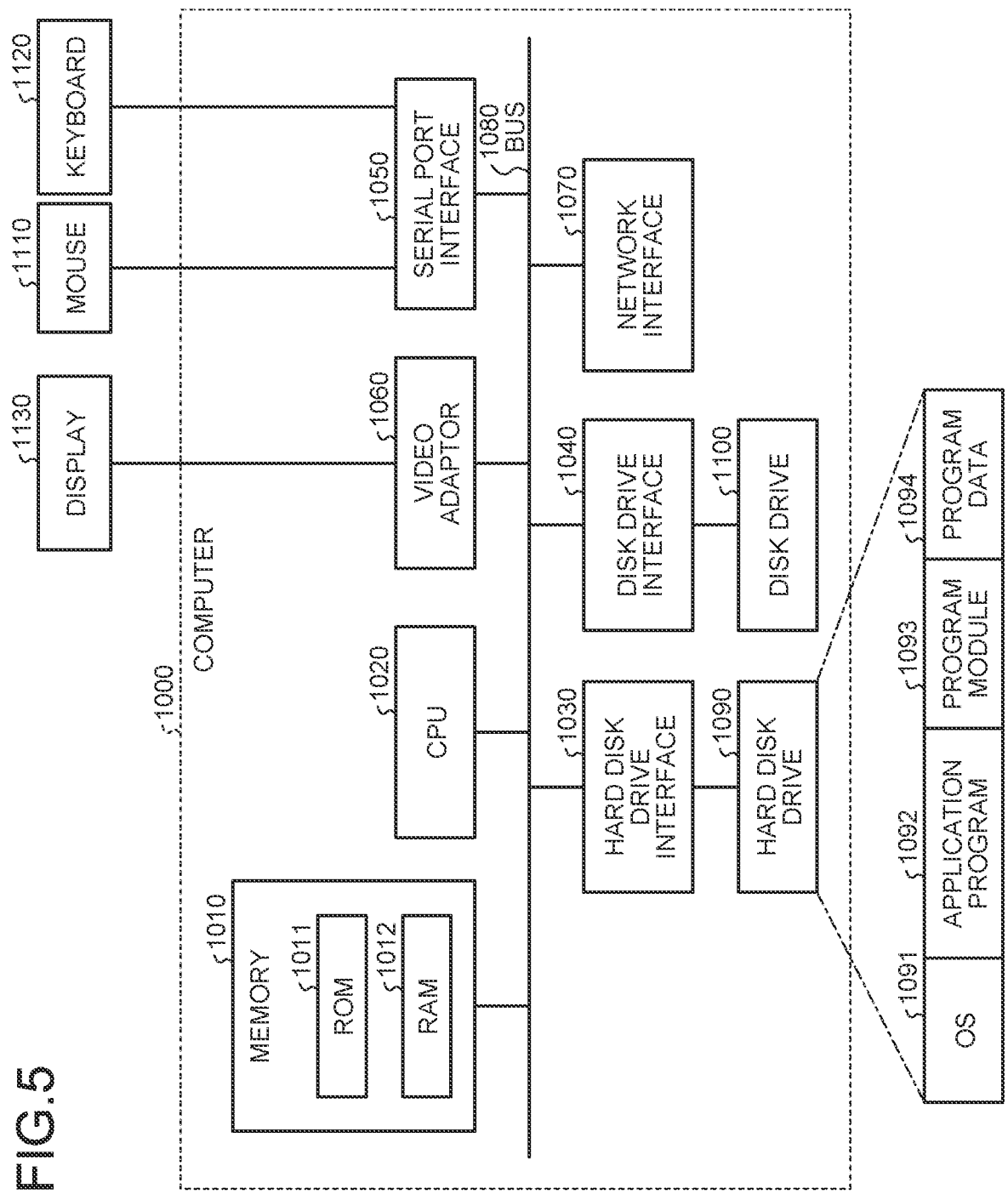
FIG. 5 is a diagram illustrating a computer executing a computer program.

FIG. 5 is a view illustrating an example of a computer that executes a user authentication computer program. A computer 1000 includes, for example, a memory 1010, a CPU 1020, a hard disk drive interface 1030, a disk drive interface 1040, a serial port interface 1050, a video adapter 1060, and a network interface 1070. Those units are connected one another by a bus 1080.

The memory 1010 includes a read only memory (ROM) 1011 and a RAM 1012. The ROM 1011 stores therein, for example, a boot program of a basic input output system (BIOS) and the like. The hard disk drive interface 1030 is connected to a hard disk drive 1031. The disk drive interface 1040 is connected to a disk drive 1041. For example, attachable/detachable storage media such as a magnetic disk and an optical disk are inserted into the disk drive 1041. For example, a mouse 1051 and a keyboard 1052 are connected to the serial port interface 1050. For example, a display 1061 is connected to the video adapter 1060.

The hard disk drive 1031 stores therein, for example, an operating system (OS) 1091, an application program 1092, a program module 1093, and program data 1094. Each information described in the embodiment is stored in, for example, the hard disk drive 1031 and the memory 1010.

The user authentication computer program is stored in the hard disk drive 1031 as, for example, the program module 1093 that describes commands executed by the computer 1000. Specifically, the program module 1093 that describes each processing executed by the user authentication device 10 described in the embodiment is stored in the hard disk drive 1031.

Data used in information processing by the user authentication computer program is stored as the program data 1094 in, for example, the hard disk drive 1031. The CPU 1020 reads the program module 1093 and the program data 1094 stored in the hard disk drive 1031 into the RAM 1012 as needed, and executes each procedure described above.

The program module 1093 and the program data 1094 according to the user authentication computer program are not always stored in the hard disk drive 1031, and may be stored in, for example, an attachable/detachable storage medium and be read by the CPU 1020 via the disk drive 1041 and the like. The program module 1093 and the program data 1094 according to the user authentication computer program may be stored in the other computer connected via networks such as a local area network (LAN) and a wide area network (WAN), and be read by the CPU 1020 via the network interface 1070.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A user authentication device comprising:
a memory; and
a processor coupled to the memory and programmed to execute a process comprising;
collecting information of a user, wherein the information specifies a user skill;
constructing, using the collected information, a skill model that has learned a category of a task to be performed by the user and the user skill, wherein the task is according to the user skill;
generating, using the constructed skill model, a question for the user that causes the user to perform a task corresponding to the category and the user skill;
presenting the generated question to the user via an application that outputs the question and instructing the user to perform the task, when authentication of the user is required;
receiving, from the user via an application into which the response is input, an accuracy of an answer of the user to the question, a response time, or characteristics at a time of solving the question a result of performing the task as a response to the presented question;
determining that the authentication of the user is successful if the accuracy of an answer to the question, the response time, and the characteristics at a time of solving the question are within a range of parameters set by the skill model;
applying, by the application, a given flag indicating that the received response does not satisfy a given condition, as two-element authentication of the user, wherein an element of the two-element authentication comprises authentication of the user on the basis of the user skill of the performed task indicated by the received response, and the other element of the two-element authentication comprises authentication that is distinct from the authentication on the basis of the user skill;
updating the skill model each time the user is authenticated, by inputting the accuracy of an answer of the user to the question, the response time, or the characteristics at a time of solving the question of data; and
granting intended access to data by logging into the application by indicating, by the application, on the basis of a result of the two-element authentication, a warning on a display to the user to control the intended access to data by logging into the application.

2. The user authentication device according to claim 1, further comprising collecting the information using text analysis, natural language processing, or semantic analysis.

3. The user authentication device according to claim 1, further comprising generating, as the question, a numerical question, a mathematic question, a physical question, a mechanical question, a reading exercise, or a speed chess.

4. The user authentication device according to claim 1, further comprising presenting another question if the response does not satisfy a given condition.

5. The user authentication device according to claim 1, further comprising applying a given flag to the response if the response does not satisfy a given condition.

6. A user authentication method performed by a user authentication device, the user authentication method comprising:
collecting information of a user, wherein the information specifies a user skill;
constructing, using the collected information, a skill model that has learned a category of a task to be performed by the user and the user skill, wherein the task is according to the user skill;
generating, using the constructed skill model, a question for the user, that causes the user to perform a task corresponding to the category and the user skill;
presenting the generated question to the user via an application that outputs the question and instructing the user to perform the task, when authentication of the user is required;
receiving, from the user via an application into which the response is input, an accuracy of an answer of the user to the question, a response time, or characteristics at a time of solving the question as a response to the presented question;
determining that the authentication of the user is successful if the accuracy of an answer to the question, the response time, and the characteristics at a time of solving the question are within a range of parameters set by the skill model;
applying, by the application, a given flag indicating that the received response does not satisfy a given condition, as two-element authentication of the user, wherein an element of the two-element authentication comprises authentication of the user on the basis of the user skill of the performed task indicated by the received response, and the other element of the two-element authentication comprises authentication that is distinct from the authentication on the basis of the user skill;

updating the skill model each time the user is authenticated, by inputting the accuracy of an answer of the user to the question, the response time, or the characteristics at a time of solving the question as data; and granting intended access to data by logging into the application by indicating, by the application, on the basis of a result of the two-element authentication, a warning on a display to the user to control the intended access to data by logging into the application.

7. A non-transitory recording medium recording a user authentication computer program to be executed by a computer, the program causing the computer to perform operations comprising:

collecting information of a user, wherein the information specifies a user skill;

constructing, using the collected information, a skill model that has learned a category of a task to be performed by the user and the user skill, wherein the task is according to the user skill;

generating, using the constructed skill model, a question for the user that causes the user to perform a task corresponding to the category and the user skill;

presenting the generated question to the user via an application that outputs the question and instructing the user to perform the task, when authentication of the user is required;

receiving, from the user via an application into which the response is input, an accuracy of an answer of the user to the question, a response time, or characteristics at a time of solving the question as a response to the presented question;

determining that the authentication of the user is successful if the accuracy of an answer to the question, the response time, and the characteristics at a time of solving the question are within a range of parameters set by the skill model;

applying, by the application, a given flag indicating that the received response does not satisfy a given condition, as two-element authentication of the user, wherein an element of the two-element authentication comprises authentication of the user on the basis of the user skill of the performed task indicated by the received response, and the other element of the two-element authentication comprises authentication that is distinct from the authentication on the basis of the user skill;

updating the skill model each time the user is authenticated, by inputting the accuracy of an answer of the user to the question, the response time, or the characteristics at a time of solving the question as data; and granting intended access to data by logging into the application by indicating, by the application, on the basis of the two-element authentication, a warning on a display to the user to control the intended access to data by logging into the application.

* * * * *